United States Patent
Ofer et al.

(10) Patent No.: US 7,484,059 B1
(45) Date of Patent: Jan. 27, 2009

(54) FULL ARRAY NON-DISRUPTIVE MIGRATION OF EXTENDED STORAGE FUNCTIONALITY

(75) Inventors: Adi Ofer, Framingham, MA (US); Kiran Madnani, Framingham, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 397 days.

(21) Appl. No.: 11/427,699

(22) Filed: Jun. 29, 2006

(51) Int. Cl.
*G06F 12/00* (2006.01)
(52) U.S. Cl. .................................... 711/162
(58) Field of Classification Search ........................ None
See application file for complete search history.

(56) References Cited

U.S. PATENT DOCUMENTS

| | | | |
|---|---|---|---|
| 6,363,462 B1 * | 3/2002 | Bergsten ...................... 711/162 |
| 6,598,174 B1 * | 7/2003 | Parks et al. ...................... 714/6 |
| 6,714,952 B2 * | 3/2004 | Dunham et al. ............. 707/204 |
| 6,839,750 B1 | 1/2005 | Bauer et al. |
| 7,051,101 B1 | 5/2006 | Dubrovsky et al. |
| 7,219,092 B2 * | 5/2007 | Ikegaya et al. .................. 707/3 |
| 2004/0054618 A1 * | 3/2004 | Chang et al. ................... 705/38 |

OTHER PUBLICATIONS

Madnani; U.S. Appl. No. 11/241,165, filed Sep. 30, 2005; 49 pages.
Madnani, et al.; U.S. Appl. No. 11/318,756, filed Dec. 27, 2005; 77 pages.
Ofer, et al.; U.S. Appl. No. 11/427,664, filed Jun. 29, 2006; 76 pages.
Madnani, et al.; U.S. Appl. No. 11/427,677, filed Jun. 29, 2006; 75 pages.
Madnani, et al.; U.S. Appl. No. 11/427,685, filed Jun. 29, 2006; 74 pages.

* cited by examiner

*Primary Examiner*—Hiep T Nguyen
(74) *Attorney, Agent, or Firm*—Guerin & Rodriguez, LLP; Michael A. Rodriguez

(57) ABSTRACT

Described are systems and methods of migrating data and metadata from a source storage array to a destination storage array transparently with respect to a storage application executing on a host. The storage application provides particular storage functionality at the source storage array while using metadata during its execution. During a data migration event in which data resident in disks at the source storage array are fully copied to the destination storage array, metadata stored at the source storage array are copied to the destination storage array. After the data migration event, the destination storage array assumes the personality of the source storage array.

23 Claims, 16 Drawing Sheets

80

| LUN NAME | PORT ID | LUN # |
|---|---|---|
| m | 0 | 40 |
| n | 0 | 41 |
| p | 0 | 42 |
| q | 1 | 50 |
| r | 1 | 51 |
| s | 1 | 52 |
| t | 2 | 60 |
| u | 2 | 61 |
| v | 2 | 62 |
| x | 3 | 70 |
| y | 3 | 71 |
| z | 3 | 72 |

| LUN NAME | PORT ID | LUN # |
|---|---|---|
| m | 2 | 40 |
| n | 2 | 41 |
| p | 2 | 42 |
| q | 3 | 50 |
| r | 3 | 51 |
| s | 3 | 52 |
| t | 0 | 60 |
| u | 0 | 61 |
| v | 0 | 62 |
| x | 1 | 70 |
| y | 1 | 71 |
| z | 1 | 72 |

SOURCE ARRAY

PORT-NAME
TRANSLATION TABLE
67a

| PORT NAME | NEW PORT NAME |
|---|---|
| A | C |
| B | D |
|  |  |

DESTINATION ARRAY

PORT-NAME
TRANSLATION TABLE
69a

| PORT NAME | NEW PORT NAME |
|---|---|
| C | A |
| D | B |
|  |  |

FIG. 14

LUN-NAME
TRANSLATION TABLE
67b

| LUN NAME | NEW LUN NAME |
|---|---|
| m | t |
| n | u |
| p | v |
| q | x |
| r | y |
| s | z |

LUN-NAME
TRANSLATION TABLE
69b

| LUN NAME | NEW LUN NAME |
|---|---|
| t | m |
| u | n |
| v | p |
| x | q |
| y | r |
| z | s |

FIG. 15

LUN-NUMBER
TRANSLATION TABLE
67c

| LUN # | NEW LUN # |
|---|---|
| 40 | 60 |
| 41 | 61 |
| 42 | 62 |
| 50 | 70 |
| 51 | 71 |
| 52 | 72 |

LUN-NUMBER
TRANSLATION TABLE
69c

| LUN # | NEW LUN # |
|---|---|
| 60 | 40 |
| 61 | 41 |
| 62 | 42 |
| 70 | 50 |
| 71 | 51 |
| 72 | 52 |

FIG. 16

FULL ARRAY NON-DISRUPTIVE MIGRATION OF EXTENDED STORAGE FUNCTIONALITY

RELATED APPLICATION

This patent application is related to the following commonly owned United States patent application: "Full Array Non-Disruptive Data Migration," by Madnani et al., application Ser. No. 11/241,165, filed Sep. 30, 2005, the entirety of which application is incorporated by reference herein.

FIELD OF THE INVENTION

The present invention relates generally to storage systems. More particularly, the invention relates to migrating metadata related to providing extended storage functionality from one storage array to another storage array.

BACKGROUND

Today's enterprise data centers store ever-larger amounts of business critical data that must be immediately and continuously available, and highly reliable. Information technologists, storage managers, and administrators of storage systems take many precautions to protect against the effects of failures in order to avoid downtime. Occasionally, however, a particular storage system, such as a storage array, requires upgrading or replacement.

To replace a current storage array with a new storage array, all data and connections on the current storage array must be migrated to the new array. The storage system then requires re-initialization. In addition, the host systems previously communicating with the replaced storage array require reconfiguration. This re-initialization and reconfiguration requires some downtime to complete; consequently, host applications lose access during this period to the storage array, and potentially to some critical information. For many business systems running critical applications, this interruption is unacceptable.

There is a need, therefore, for systems and methods of upgrading or replacing storage arrays transparently with respect to host systems communicating with the storage arrays, management applications managing these arrays, and host applications providing particular storage functionality at these arrays.

SUMMARY

In one aspect, the invention features a method of migrating data from a source storage array to a destination storage array transparently with respect to a storage application executing on a host. The storage application provides particular storage functionality at the source storage array while using metadata during its execution. During a data migration event, in which data resident in disks at the source storage array are fully copied to the destination storage array, metadata stored at the source storage array and used by the storage application are forwarded to the destination storage array.

In another aspect, the invention features a storage network comprising memory storing metadata and a first storage array executing program code for performing a particular storage functionality. The program code accesses the metadata in the memory during its execution. A second storage array is in communication with the first storage array by a communication link. A replication engine, during a data migration event in which data resident in disks at the first storage array are fully copied to the second storage array, forwards the metadata stored in memory to the second storage array.

In still another aspect, the invention features a storage array comprising memory storing metadata and program code for performing a particular storage functionality. Thee program code accesses metadata in the memory during its execution. During a data migration event, in which data resident in disks at the storage array are fully copied to a destination storage array, a replication engine forwards the metadata stored in memory to the destination storage array.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is an exemplary representation of a LUN table for mapping LUN numbers to port IDs and LUN names prior to a data migration event.

FIG. 10 is an exemplary representation of the LUN table of FIG. 4 after completion of the data migration event.

FIG. 14 is an exemplary representation of port-name translation tables for the source and destination arrays.

FIG. 15 is an exemplary representation of LUN-name translation tables for the source and destination arrays.

FIG. 16 is an exemplary representation of LUN-number translation tables for the source and destination arrays.

DETAILED DESCRIPTION

Storage networks that support data migration events, as described herein, move data from one or more source storage arrays to one or more destination storage arrays. The migration of the data occurs transparently with respect to the hosts and host applications that may be communicating with the storage arrays. To achieve this transparency, the source and destination storage arrays exchange connection information (i.e., the names of their array ports and of their logical units or LUNs). The exchange of the connection information causes the hosts to communicate with the destination storage array instead of with the source storage array. This enables host communication with the migrated LUNs to continue uninterrupted, thereby eliminating application downtime for an array upgrade or replacement.

In accordance with one embodiment of the invention, the source and destination storage arrays also exchange management information (i.e., control plane functionality). The exchange of management information makes the migration of data and connection information transparent to management applications. That is, management applications can continue to communicate with the storage arrays, unaffected or uninterrupted by the data and connection migration, in effect, unaware of the full transfer of data from one storage array to another storage array. Consequently, data migration events require no modification to many of the commercially available management applications used by administrators to manage their storage networks.

In addition to the migration of data from a source storage array to a destination storage array, another embodiment of the invention migrates metadata associated with applications that extend storage functionality, examples of which are data back-up applications. In general, the metadata represents information critical to the proper operation of the extended storage functionality application. If a data migration event occurs during execution of an extended storage functionality application, then migration of the metadata to the destination storage array ensures that the extended storage functionality application can continue to operate properly, i.e., uninterrupted during and after the data migration event.

Other embodiments of the invention transfer all data resident in disks from a single source storage array to a plurality of destination storage arrays, in a process referred to as array partitioning. Still other embodiments transfer all disk data from a plurality of source storage arrays to a single destination storage array, in a process referred to as array consolidation. Array partitioning and array consolidation involve transferring data and exchanging connections. Such processes can also include the exchange of management information and the transfer of extended storage functionality metadata.

Figure 1:
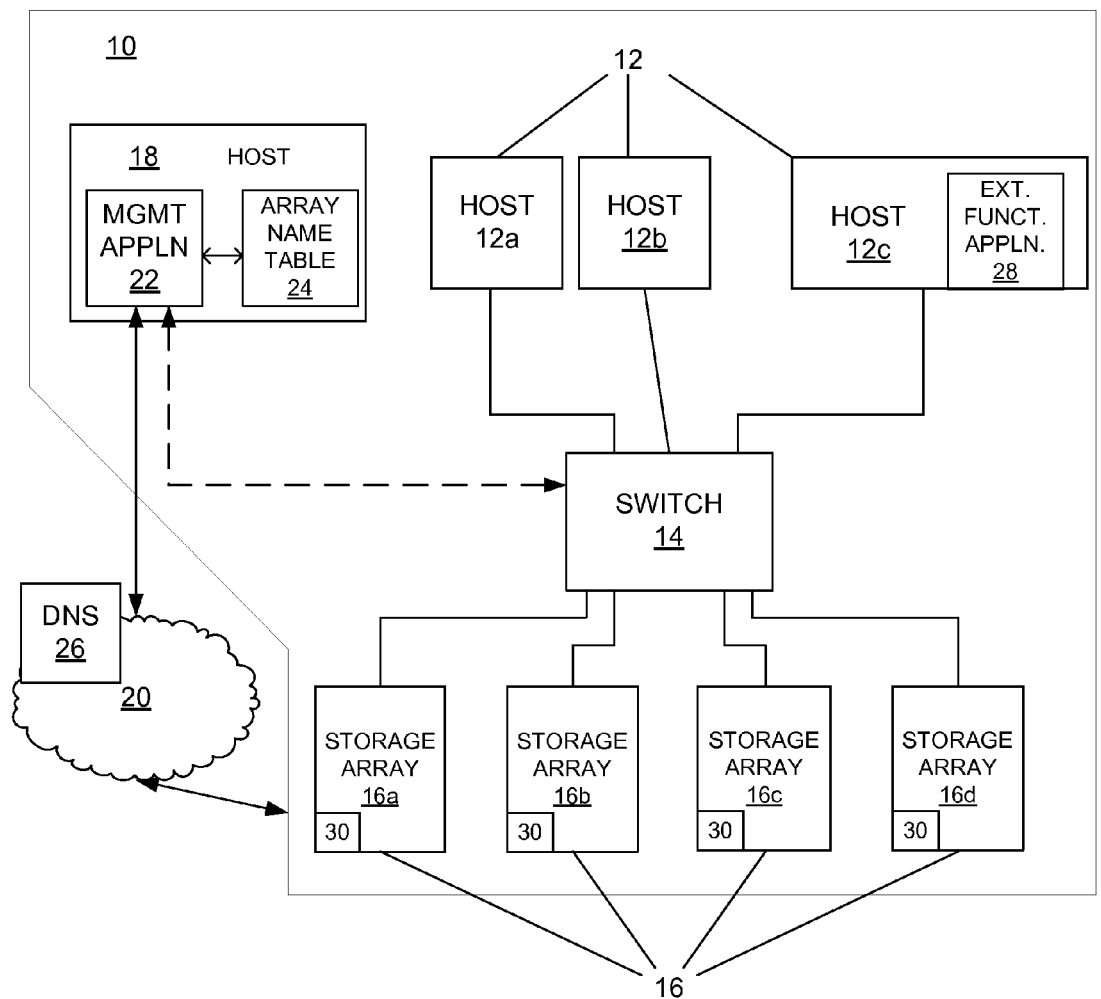
FIG. 1 is a functional block diagram of an embodiment of a storage area network (SAN) in communication with a plurality of hosts and with a management station, the SAN including multiple storage arrays coupled to the hosts through a switch fabric and to the management station through a network.

FIG. 1 shows an exemplary storage area network (SAN) 10 in which the invention can be implemented. The SAN 10 employs a Fibre Channel fabric topology. Fibre Channel is a high-speed serial transport used in storage systems. The transport is described in a series of standards that can be found at X3T9.3 *Task Group of ANSI. Fibre Channel Physical and Signaling Interface (FC-PH)*, Rev. 4.2 Oct. 8, 1993. Hosts 12, shown individually as host 12*a*, host 12*b*, and host 12*c*, are coupled to a Fibre Channel "fabric" in the storage system, herein shown as a switch 14. Storage arrays 16, shown individually as 16*a*, 16*b*, 16*c*, and 16*d*, are also coupled to the switch 14. The hosts 12 communicate with disks or disk drives 58 (FIG. 2) of any of the storage arrays 16 using a cross-point Fibre Channel connection through the switch 14.

Each storage array 16 has an array management interface—i.e., management information by which a remotely executing management application may identify the storage array and its devices (e.g., logical units or LUNs) and send management messages or packets to the storage array. The storage arrays can export their array management interface through an application program interface (API). Through use of this management API, management applications can manage and control the storage arrays and their devices (e.g., LUNs).

In one embodiment, the array management interface of each storage array includes such management information as a logical serial number, an array name, a network address (e.g., IP address), a gatekeeper (for some types of storage arrays, e.g., EMC Corporation's Symmetrix™), and alphanumeric identifiers for the LUNs of that storage array. A gatekeeper, as used herein, is a small LUN that maintains data about the LUNs of the storage array. Management applications can communicate with the gatekeeper, for example, to discover the LUNs on the storage array.

Another host 18, referred to as a management station, is also in communication with the storage arrays 16 over an Internet Protocol (IP) network 20. Executing at the management station 18 is a management application 22 used by a storage network administrator to manage (i.e., discover, access, configure, and monitor) the storage arrays 16 and their disks. Examples of management applications that may be used in the practice of the invention include, but are not limited to, NAVISPHERE® Management Suite and EMC Control Center (ECC)®/Open Edition, each produced by EMC Corporation of Hopkinton, Mass.

Communication between the management application 22 and the storage arrays 16 can transpire in accordance with any transport protocol. For example, the host 18 and storage arrays 16 can communicate over the IP network 20 according to the TCP/IP and HTTP protocols. As another example, the host 18 and storage arrays 16 can communicate through the Fibre Channel switch 14 using the Fibre Channel protocol. For facilitating communication, an array name table 24 maintains associations of array serial numbers with array names. In addition, a Domain Name Server (DNS) 26 maintains associations of storage array names with network IP addresses. As shown for purposes of illustration, the management station 18 maintains the array name table 24, and the DNS server 26 resides on the network 20.

In FIG. 1, the host 12*c* has a host application 28 referred to generally as an extended storage functionality application. In general, the host application 28 includes program code for performing an operation on the data stored in the disks 58 at a storage array. The storage arrays have program code 30 that cooperates with the host application 28 to perform the operation. This program code 30 at the storage array maintains and updates metadata. The program code 30 the metadata throughout its execution to accomplish the designed functionality of the host application 28.

As an example of an extended storage functionality application, a data back-up program copies the data contents of a production device to a backup device located in the same storage array. The copy is a snapshot in time of the data of the production device. To accomplish this designed functionality, the backup program maintains certain types of metadata, e.g., information that tracks which logical blocks of a device have been copied to the backup device, and changes (i.e., deltas) to the contents of the production device that have occurred since the backup program started executing. An example of data back-up program that may be adapted to practice the invention is SnapView™, produced by EMC Corporation of Hopkinton, Mass. (See invention disclosure for a list of other products that apply here.) The principles of the invention apply to various types of extended storage functionality applications, provided such applications produce and maintain metadata. Different extended storage functionality applications typically employ different types of metadata, and any type of metadata may be migrated from one storage array to another storage array as described herein.

Figure 2:
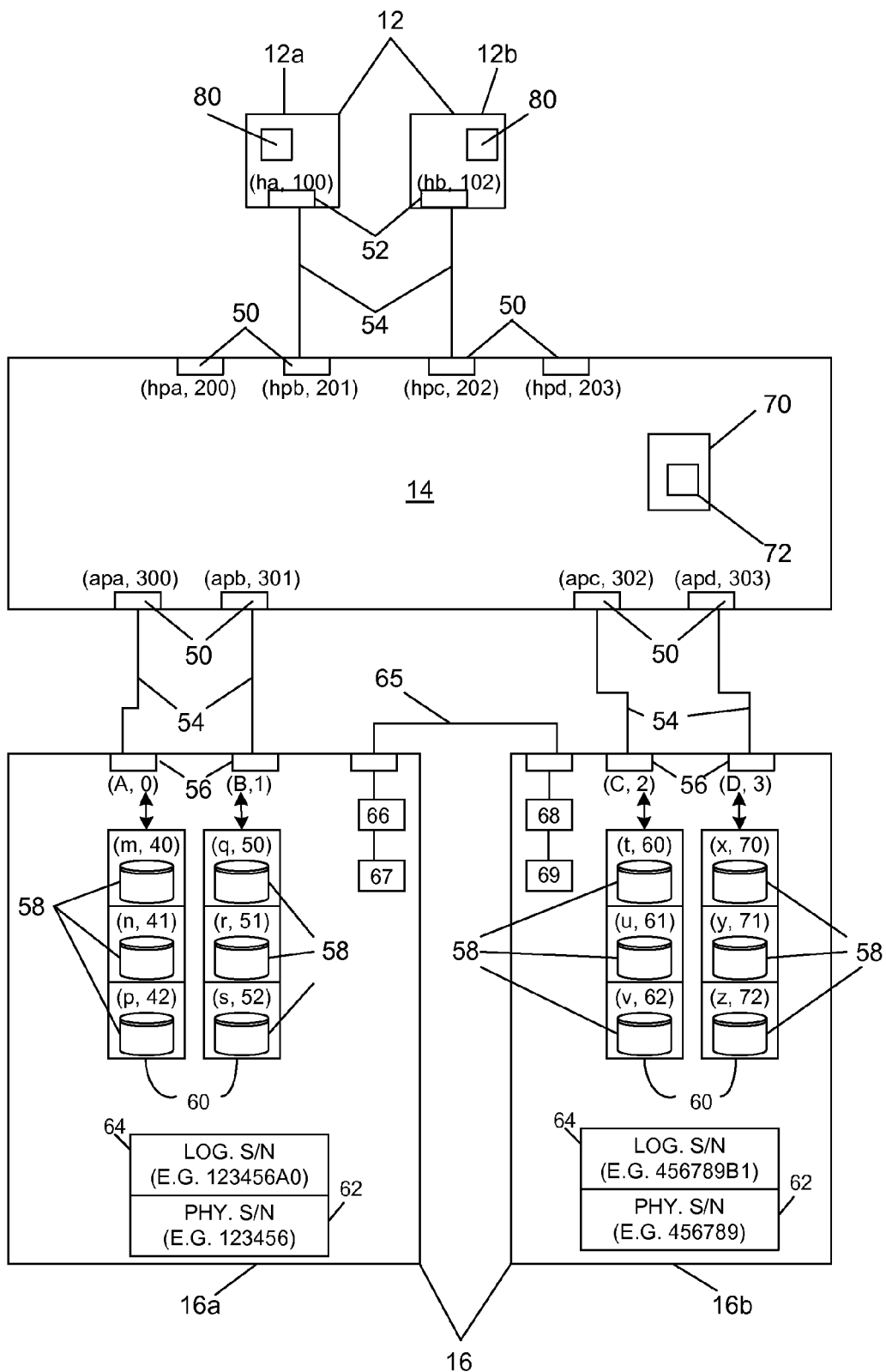
FIG. 2 is a block diagram of the SAN of FIG. 1, showing two of the hosts, the switch fabric, and two of the storage arrays.

FIG. 2 shows the hosts 12*a*, 12*b*, the storage arrays 16*a*, 16*b*, and the switch 14 in more detail. The switch 14 includes switch ports 50. As used herein, switch ports 50 that are coupled to a host are referred to as host-facing ports, and those that are coupled to a storage array are referred to as array-facing ports. Host ports 52 on the hosts 12 are coupled by Fibre Channel links 54 to host-facing switch ports 50 on the switch 14. Array ports 56 on the arrays 16 are coupled by Fibre Channel links 54 to array-facing switch ports 50 on the switch 14. Within each storage array 16 are arrays of disks 58. The disks 58 are arranged into LUNs 60. The storage arrays 16 export the LUNs for access by the hosts 12 over the Fibre Channel links 54 through the switch 14. As herein shown, each disk 58 is configured as a separate LUN 60, though it is understood that a LUN can encompass part of a disk, or parts of multiple disks, or multiple complete disks. The arrangement shown is chosen for convenience of description.

In a Fibre Channel system, such as that of FIG. 2, each Fibre Channel device (including, but not limited to, host ports, array ports, and LUNs) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID". The Fibre Channel address is dynamic and dependent upon the configuration of the system. The IDs are used for directing information between the hosts 12 and the storage arrays 16 and LUNs 60 in the system. Port addresses are referred to as "port IDs".

After initialization, the hosts 12 communicate with the storage arrays 16 and LUNs 60 by sending messages to the appropriate array port and LUN addresses. The hosts 12 adapt to new port and LUN addresses, but each device in use maintains its same name in order for uninterrupted communications to continue.

In a Fabric topology, the switch 14 assigns IDs to the host ports 52 and array ports 56 during initialization. IDs, as described in the Fibre Channel specification, are 24-bit quantities containing several fields. For purposes of this description, it is sufficient to understand that the ID assigned to an array port 56 is a derivative of the switch name and the ID of the switch port 50. Thus, an array port 56 name depends on the switch port 50 to which it is coupled.

Throughout this description, names and IDs are shown symbolically with alphanumeric symbols for simplicity of explanation. In FIG. 2, the names and IDs of each port and LUN are shown as a pair (name, ID). The host ports 52 are shown to have name-ID pairs of (ha, 100) and (hb, 102). The name-ID pairs of the host-facing switch ports 50 are shown as (hpa, 200), (hpb, 201), (hpc, 202), and (hpd, 203). Host-facing port (hpb, 201) is coupled to a host port (ha, 100) on the host 12*a* and host-facing port (hpc, 202) is coupled to a host port (hb, 102) on the host 12*b*.

Each array-facing switch port 50 and each array port 56 have a name and ID. In this exemplary illustration, the array ports 56 of the storage array 16*a* have name-ID pairs of (A, 0) and (B, 1), and those of the storage array 16*b* have name-ID pairs of (C, 2) and (D, 3). The array-facing switch ports 50 have the following name-ID pairs: array-facing switch port (apa, 300) is coupled to an array port 56 (A, 0) on the array 16*a*; array-facing switch port (apb, 301) is coupled to an array port 56 (B, 1) on the array 16*a*; array-facing switch port (apc, 302) is coupled to an array port 56 (C, 2) on the array 16*b*; and array-facing switch port (apd, 303) is coupled to an array port 56 (D, 3) on the array 16*b*.

Each LUN 60 in each array 16 also has a name and a LUN number, referred to as a name/number pair (LUN name, LUN number). The array 16*a* includes LUNs (m, 40), (n, 41), and (p, 42), which are accessible by array port (A, 0), and LUNs (q, 50), (r, 51), and (s, 52), which are accessible by array port (B, 1). The array 16*b* includes LUNs (t, 60), (u, 61) and (v, 62), which are accessible by array port (C, 2), and LUNs (x, 70), (y, 71), and (z, 72), which are accessible by array port (D, 3). It is noted that some LUNs may have more than one LUN number for purposes of LUN access by multiple hosts by multiple array ports. However, for clarity of the present description, each LUN has one LUN number.

Each storage array 16*a*, 16*b* also has a unique (worldwide) physical serial number 62 and a unique (worldwide) logical serial number 64. Initially, the logical serial number 64 of each storage array 16*a*, 16*b* is derived from the physical serial number 62 of that storage array. The logical serial number 64 can be used to uniquely identify the storage array to which it is assigned. In the example shown in FIG. 2, the logical serial number 64 is derived by appending two alphanumeric digits to the physical serial number 62. (e.g., for storage array 16*a*, the physical serial number is 123456 and the logical serial number is 123456A0; for storage array 16*b*, the physical serial number is 456789 and the logical serial number is 456789B1). Logic or software within each storage array 16 can derive and store the initial logical serial number upon the array's initialization.

The logical serial number 64, in effect, disassociates the serial number from the physical hardware (i.e., the storage array). When each storage array 16 presents its serial number as part of its exposed array management interface, the storage array 16 is presenting its logical serial number. The physical serial number of the storage array does not change, whereas the logical serial number changes as a consequence of a data migration event, as described herein.

The source and destination arrays 16a and 16b are connected by a point-to-point link 65. This link 65 could pass through the switch 14, but for purposes of illustration is shown as a point-to-point connection between the arrays 16a, 16b. The arrays 16a, 16b use the link 65 for exchanging data, metadata, messages, connection information, and management information, as described further below. The storage array 16a includes an array controller 66 coupled to translation tables 67. The storage array 16b includes an array controller 68 coupled to translation tables 69.

In one embodiment, the Fibre Channel switch 14 includes a name server database 70. The switch 14 uses the name server database 70 to assign IDs to host ports 52 and to array ports 56 during initialization. The name server database 70 includes a name server table 72 used by the switch 14 to resolve IDs to names. An example of the name server table 72 is shown in more detail in FIG. 3. The full contents of the name server table 72 are described in the Fibre Channel Name Server MIB, described in the IETF RFC 4044, "Fibre Channel Management MIB", herein incorporated by reference. In another embodiment, a name server separate and distinct from the switch 14 can maintain the name server database 70.

Figure 3:
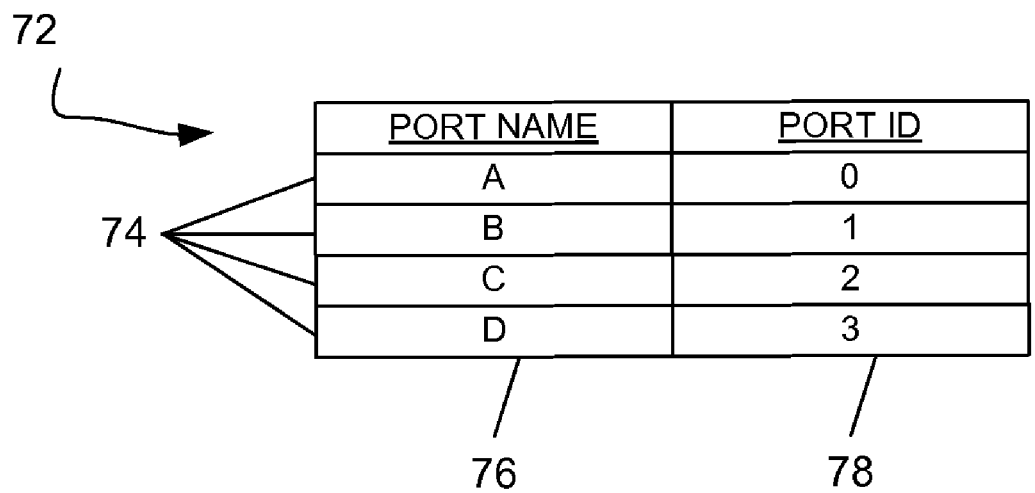
FIG. 3 is an exemplary representation of a name server table resident in the switch fabric prior to a data migration event.

FIG. 3 shows an embodiment of the name server table 72 including multiple entries 74. Each entry 74 includes a port name field 76 and a port address field 78. During initialization, a Fibre Channel device attached to a switch port 50, for example the array 16a, sends the names of the array ports 56 to the switch 14. In response, the name server database 70 sends an ID for each array port 56 to the storage array 16a. The name server database 70 stores each array port name and corresponding ID in an entry 74 in the name server table 72.

In the example of FIG. 3, the name server table 72 includes entries 74 for the port names A and B from the array 16a, and entries 74 for the port names C and D from the array 16b. The IDs 0 and 1 have been assigned by the Fibre Channel switch 14 to the port names A and B, and IDs 2 and 3 have been assigned to the port names C and D. After the arrays 16a and 16b are initialized, the switch 14 sends the name server table 72 to all members of the SAN 10 registered to receive state change notifications. This includes the hosts 12 (and the management station 18). The hosts 12 have the IDs of the arrays 16 so that Fibre Channel communications between the hosts 12 and arrays 16 can ensue.

After the hosts 12 have IDs to access the array ports 56, they can learn what LUNs 60 are available. LUN names and numbers are managed at the array level. Each host 12 sends a query to each array port 56 ID, in turn, requesting a list of available LUN numbers. After the LUN numbers for a given array port ID are known, the host 12 is able to query each LUN 60 by using a combination of the port ID and LUN number to access the LUNs. The host 12 then queries each LUN 60 for its corresponding LUN name. After the host 12 has gathered this information, it builds a directory LUN table 80 that relates LUN names, to port IDs and LUN numbers.

FIG. 4 shows a representative embodiment of a LUN table 80. The LUN table 80 includes an entry 82 for each LUN 60 that the host has discovered. Each entry 82 includes a LUN name field 84, a port ID field 88, and a LUN number field 90, which, in combination, identify the LUN 60. In the portion of the table shown, the LUN table 80 for a host 12 includes the LUN names, port IDs, and LUN numbers for the LUNs 60 on the array 16a and the LUNs 60 on the array 16b. For example, the LUNs 60 associated with the array port 56 address 0 are (m, 40), (n, 41), and (p, 42).

During operation, hosts 12 refer to LUNs 60 by their LUN numbers. To access a LUN 60, a host port 52 sends a message whose Fibre Channel address includes the port ID and LUN number. The switch 14 parses the port ID portion of the address in order to forward the message to the identified array port 56. The array 16 then uses the LUN number portion of the address to access the proper LUN 60 within the array 16. For example, if host 12a needs to access LUN #62, the host port 52 sends a message to an address that includes the port ID 2 and the LUN number 62. The switch 14 sees the port ID 2 and sends the message to the array port 56 with ID 2. The array sees the LUN # 62 and sends the message from array port 56 with ID 2 to LUN number 62. Each storage array 16a, 16b is given an array name (e.g., factory-set, administrator assigned) and is configured with an IP address.

Figure 5:
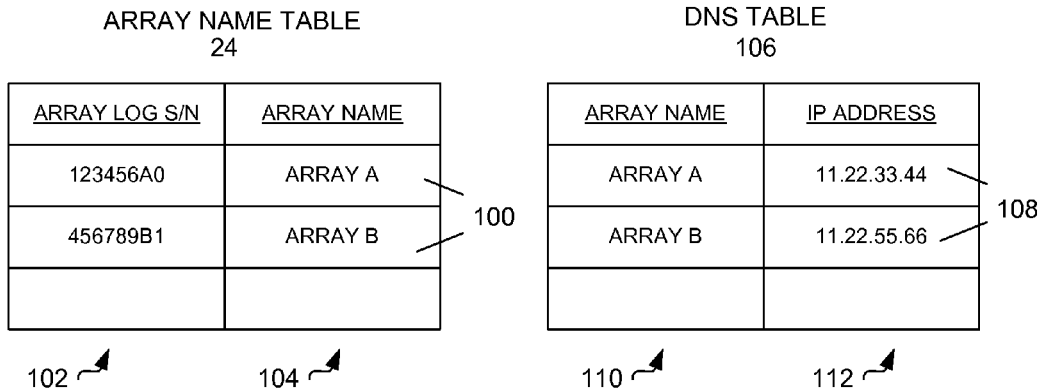
FIG. 5 are exemplary representations of an array name table used by a host to map serial numbers to storage array names and of a DNS table used to resolve storage array names to IP addresses.

FIG. 5 shows an embodiment of the array name table 24 having entries 100. Each entry 100 includes a serial number field 102 and an array name field 104. During initialization, each storage array 16 exports its logical serial number 64, array name, and device numbers to the management station 18. With this information, the management station 18 builds the array name table 24 that maps array serial numbers to array names. In the example shown, the array name table 24 associates logical serial number "123456A0" with array name "Array A" and logical serial number "456789B1" with array name "Array B".

FIG. 5 also shows an embodiment of a DNS table 106 for mapping array names to IP addresses. The DNS table 106 includes entries 108, each with an array name field 110 and a network address field 112. In the example shown, the DNS table 106 associates array name "ARRAY A" with IP address 11.22.33.44 and array name "ARRAY B" with IP address 11.22.55.66.

The management station 18 can communicate with the LUNs 60 at the storage arrays by sending management messages (e.g., in IP packets) over the network 20 using the appropriate IP address of the targeted storage array. In preparing messages for transmission over the network 20, the management application 22 uses the serial number exposed by the targeted storage array to obtain its array name from the array name table 24. The management application 22 also communicates with the DNS server 26 to obtain an IP address based on the array name retrieved from the array name table 24.

If the management application 22 desires to access the storage array 16b, e.g., the management application 22 acquires the array name "ARRAY B" from the array name table 24, using the serial number "456789B1" exposed by the storage array 16b as an index into the array name table 24. The serial number exposed by the storage array 16b is the logical serial number 64, which is initially derived from the physical serial number 62 before any data migration event. Using this array name, the management application 22 queries the DNS server 26 for the IP address associated with this array name. After obtaining the IP address, the management application 22 can transmit packets to the storage array 16b over the network 20.

Metadata Migration

During a data migration event, a host 12 may be running a storage application that is presently providing certain storage functionality at the storage array from which the data are being migrated. To ensure that the migration of the data and connections does not disrupt the execution the storage application, metadata used by the storage application may also be migrated.

Figure 6:
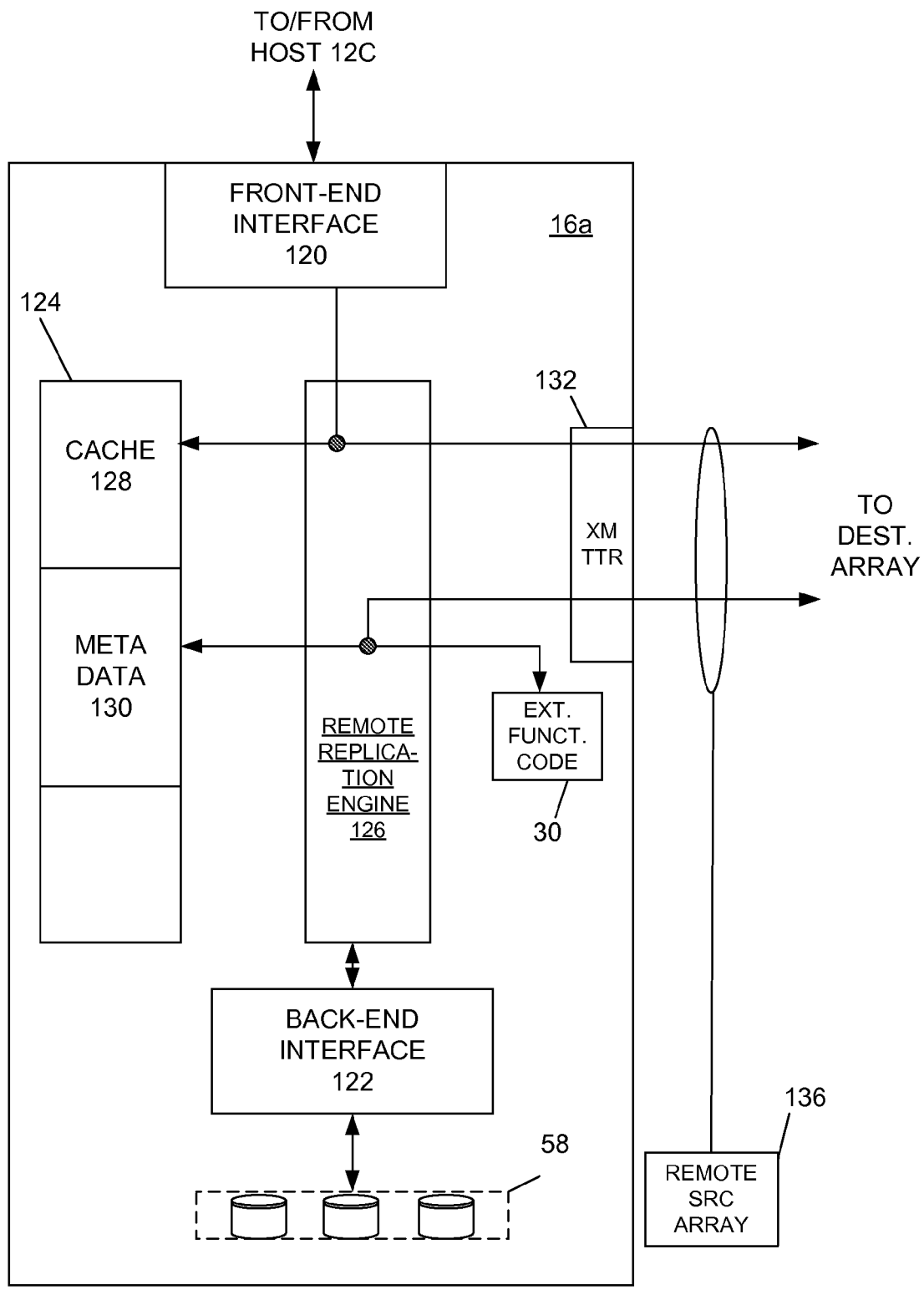
FIG. 6 is a functional block diagram representation of an embodiment of a storage array.

FIG. 6 shows embodiments of the storage array 16a (as a representative example of the storage arrays 16 in the SAN 10). The storage array 16a includes a front-end interface 120 for communicating with the hosts 12 (here, as an example, with host 12c), a back-end interface 122 for writing to and reading from the disks 58, memory 124, and a remote replication engine 126. The memory 124 has a plurality of sections including a first section allocated to cache 128 and a second section allocated to store metadata 130.

Remote replication engine 126, in general, sets up a primary mirror and synchronously copies the data of that mirror and all updates to that data to a secondary mirror. As shown, the remote replication engine 126 is in the data path between the host 12c and the disks 58. The remote replication engine 126 is also in communication with the cache 128 and with a transmitter 132 for forwarding data to a destination storage array. Data migration products such as MIRRORVIEW SYNCHRONOUS® and SRDF®/S (Symmetrix Remote Data Facility), both of EMC Corp. of Hopkinton, Masschusetts, are examples of remote replication software that may be used to migrate data.

The storage array 16a also includes the program code 30 (FIG. 1) for providing extended storage functionality. The program code 30 is an array-side component of the extended storage functionality application 28 (FIG. 1) executing at the host 12c. This extended storage functionality program code 30 generates, stores, and updates metadata 130 in the memory 124. The metadata influences the execution of the extended storage functionality application 28.

To illustrate, consider an example of a host application that provides the storage functionality of data backup of a storage device. Initially, metadata can indicate that none of the data in the storage device has yet been copied to a backup storage device. After the backup operation commences, other metadata can be used to measure the current progress of the backup, i.e., which logical units have been copied and which logical units have not, and which logical units have incurred an update since the start of the back-up operation. In general, the proper behavior of the backup operation depends upon such metadata; in this sense, the metadata influences the execution of the extended storage functionality application 28 and its corresponding array-side program code component 30.

In the embodiment of the storage array 16a shown in FIG. 6, the remote replication engine 126 is in the metadata path between the extended functionality program code 30 and the memory 124. In general, during a data migration event, the remote replication engine 126 synchronously copies and forwards the metadata 130 stored in the memory to the destination array. The remote replication engine 126 also synchronously copies updates to the metadata 130. Such updates are generated when the extended storage functionality code 30 writes new metadata to or changes existing metadata in the memory 124. In one exemplary implementation, the remote replication engine 126 treats the metadata as logical units of storage (i.e., Fibre Channel LUNs). Accordingly, the metadata can appear as numbered LUNs to the remote replication engine 126, similar to the LUNs 60. In addition, the remote replication engine 126 issues device-access function calls to write and read from a metadata LUN, just as the remote replication engine 126 accesses other LUNs 60 in the storage array 16a. Unlike the LUNs 60, metadata LUNs are not exposed to the hosts 12.

Generally, not all metadata are to be replicated and forwarded to the destination storage array. For example, the metadata related to the network connection between the storage array 16a and the destination storage array is information that need not be replicated and forwarded to the destination storage array. Notwithstanding, the storage array 16a may have established another network connection with a second storage array (e.g., source array 136 in FIG. 6). Proper operation of the extended storage functionality application 128 after the data migration event may require that the metadata related to this network connection also be transferred to the destination array. To distinguish between metadata that are not to be forwarded from metadata that are to be forwarded, each metadata have an attribute associated therewith. A value assigned to this attribute determines whether the remote replication engine 126 copies and forwards the associated metadata.

Data Migration Event

Figure 7:
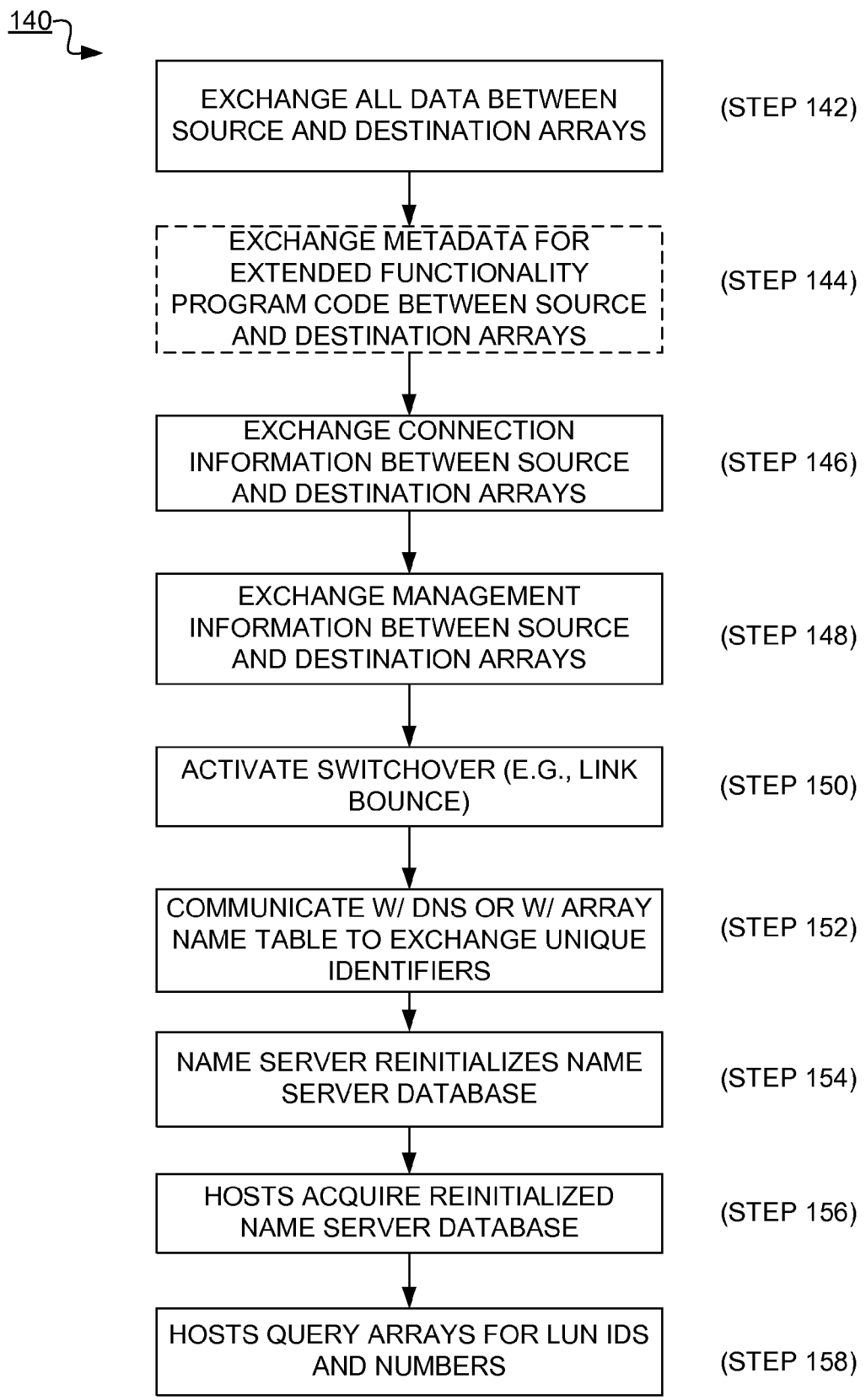
FIG. 7 is a flow diagram of an embodiment of a process for performing a data migration event in accordance with the invention.

In general, a data migration event involves moving all data resident in disks at one storage array 16, referred to as the source array, to disks at another storage array 16, referred to as a destination array, in a manner transparent to the hosts 12, 18 and to any applications hosted thereon. For purposes of example, the source array shall be array 16a, and the destination array shall be array 16b. FIG. 7 shows an embodiment of a process 140 generally representative of a data migration event. In the description of the process 140, reference is also made also to FIG. 6. At step 142, the remote replication engines 126 (of the arrays 16a, 16b) exchange the data between the source and destination arrays 16a, 16b and synchronize the arrays 16a, 16b. For the purposes of describing the process 140, consider that the remote replication engines 126 also synchronously exchange (step 144) metadata 130 (including updates), used by one or more host applications, provided the attribute associated with the metadata 130 indicates that copying is permitted.

At step 146, the source and destination arrays exchange Fibre Channel connections. More specifically, in accordance with one implementation, the Fibre Channel names of the array ports 56 on the source array 16a are exchanged with the names of the array ports 56 on the destination array 16b, and the LUN names and numbers of the source array 16a are exchanged with the LUN names and numbers of the destination array 16b.

At step 148, the source and destination arrays 16a, 16b exchange management information. More specifically, the source and destination arrays 16a, 16b exchange their current logical serial numbers, array names, and gatekeepers. Consequently, the logical serial number, array name, and gatekeeper of the destination array 16a become the new logical serial number, array name, and gatekeeper of the source array 16a and the logical serial number, array name, and gatekeeper of the source array 16a become the new logical serial number, array name, and gatekeeper of the destination array 16b.

After the data and metadata are synchronized on the source and destination arrays, and the exchanges of connection and management information are complete, a switchover is activated (step 150). To achieve a transparent data migration event, the switchover occurs atomically. One of the source and destination arrays directs (step 152) the DNS server 26 to exchange the IP addresses of the source and destination arrays. Alternatively, the management application 22 is directed to swap the array names of the source and destination arrays within the array name table 24.

The switchover induces the switch 14 (or name server) to build (step 154) a new name server table 72 for the name server database 70. The new name server table 72 reflects the new array port and name associations. The switch 14 (or name server) issues a state change notification that prompts the devices (including hosts 12) to upload (step 156) the new name server table 72. The hosts 12 then query (step 158) each of the arrays 16a, 16b to learn the new LUN name and address associations, and to receive the logical serial numbers from the storage arrays.

After completion of the data migration event, the data, metadata, connections, and management information have migrated from the source array 16a to the destination array 16b transparently, with no interruption to any applications running on the hosts 12, 18. From the perspective of the hosts 12, 18, the data migration is transparent, despite the changes to the addresses of the array ports 56, because the array port names and LUN numbers, with which the hosts 12 address their communications, are unchanged. In addition, the logical serial numbers now sent to the hosts 12 by the storage arrays 16a, 16b contribute to the appearance, from the hosts' 12 perspective, that the data has not moved, and that the hosts can still access the data at the same physical storage array as if the data migration event never occurred.

From the perspective of the management application 22, the data migration is transparent because the management information that previously directed communications to the source array 16a before the data migration event now directs communications to the destination array 16b after the data migration event. From the perspective of the extended storage functionality application 28 executing on the host 12c, although its execution has migrated to the destination array 16b, the metadata needed to continue executing properly has also migrated to the destination array 16b.

Figure 8:
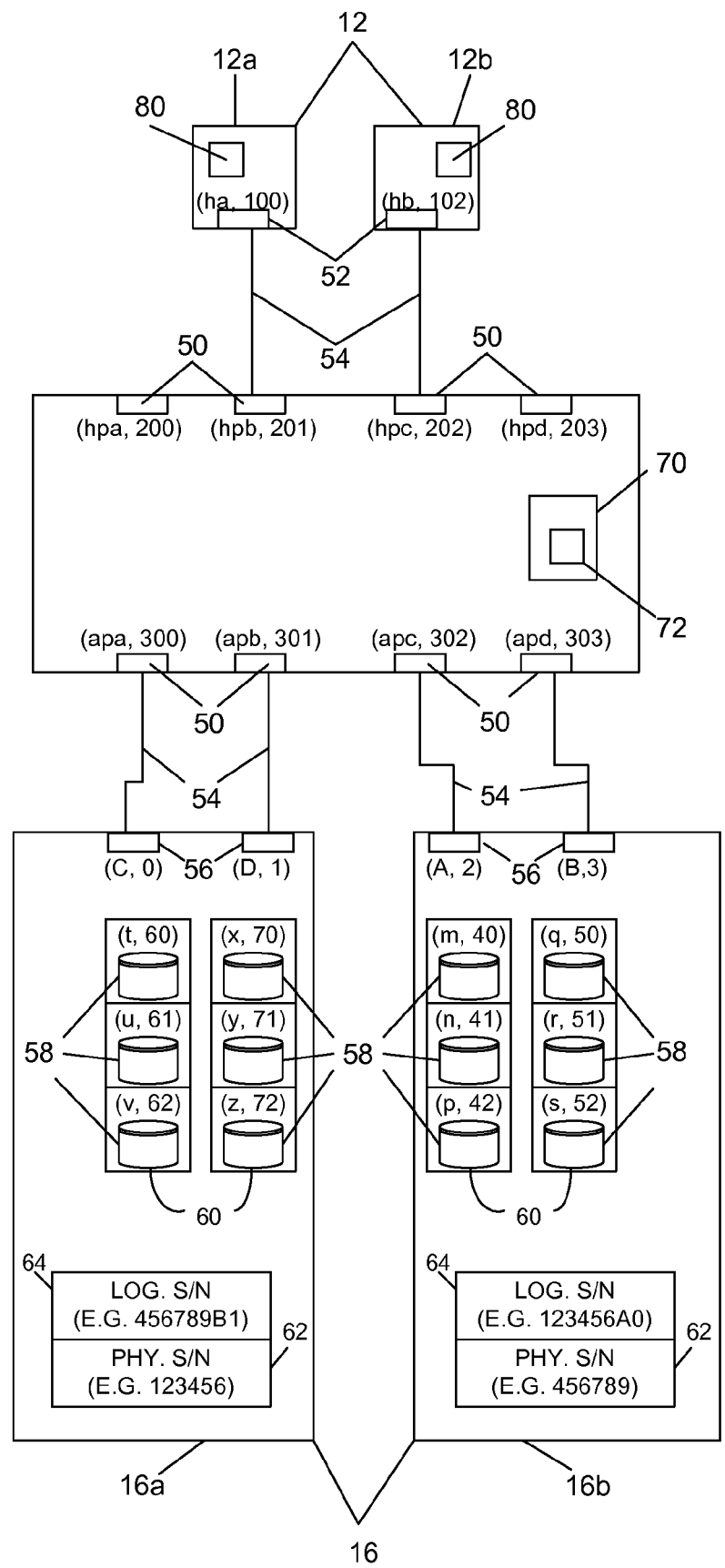
FIG. 8 is an exemplary representation of the SAN of FIG. 2 after completion of the data migration event.

FIG. 8 shows an exemplary embodiment of the storage area network 10 of FIG. 2 after completion of the data migration event. Compared to the storage area network 10 of FIG. 2, in FIG. 8 the array port names and LUN names and numbers have been exchanged between the source array 16a and destination array 16b. More specifically, after the data migration event, the array 16a includes LUNs (t, 60), (u, 61) and (v, 62), which are accessible through array port (C, 0), and LUNs (x, 70), (y, 71), and (z, 72), which are accessible through array port (D, 1). The array 16b includes LUNs (m, 40), (n, 41), and (p, 42), which are accessible through array port (A, 2), and LUNs (q, 50), (r, 51), and (s, 52), which are accessible through array port (B, 3).

Figure 9:
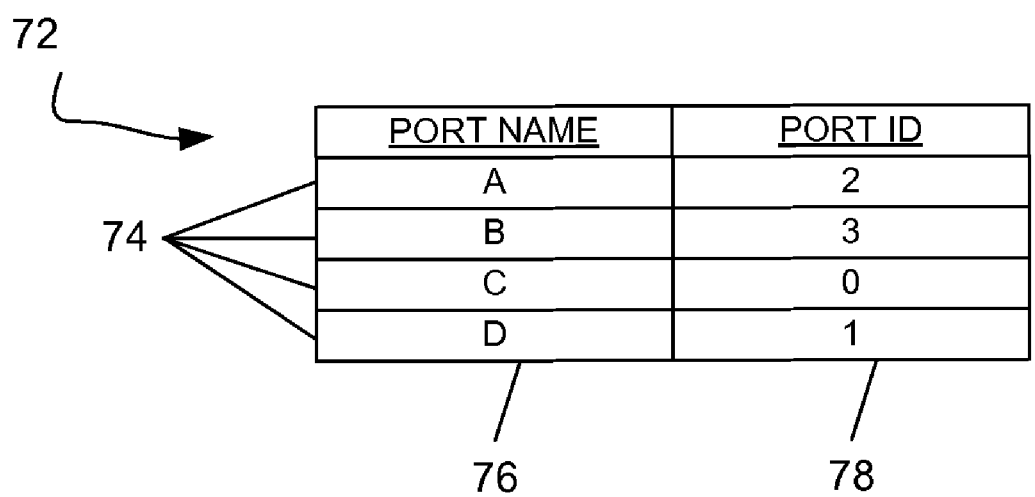
FIG. 9 is an exemplary representation of the name server table of FIG. 3 after completion of the data migration event.

FIG. 9 shows an exemplary embodiment of the name server table 72 of FIG. 3 after completion of the data migration event. Before the array port name exchange, the name server table 72 associates array port names A, B, C, D with IDs 0, 1, 2, 3, respectively, as shown in FIG. 3. After the exchange or array port names, the name server table 72 associates the array port names A, B, C, D with IDs 2, 3, 0, 1, respectively. In response to the updated name server database 70, the hosts 12 query the arrays 16 for their LUN information.

FIG. 10 shows an exemplary embodiment of the LUN table 80 after completion of the data migration event. Before the data migration event, the LUN table 80 associates LUN names with port ID/LUN number pairs as shown in FIG. 4. After the data migration event, the LUN table 80 associates LUN names with port IDs/LUN numbers pairs as shown in FIG. 10. As illustrative examples, before the data migration event LUN table 80 associates LUN m with port 0/LUN 40, and LUN t with port 2/LUN 60; after the data migration event, LUN table 80 associates LUN m with port 2/LUN 40 and LUN t with port 0/LUN 60.

Management Interface Migration

During the data migration event, the source and destination arrays 16a, 16f exchange array management interfaces including their logical serial numbers 64. More specifically, the logical serial number 64 for the source array 16a has become "456789B1", whereas the logical serial number 64 for the destination array 16b has become "123456A0". Note that the physical serial numbers 62 assigned to the source and destination arrays 16a, 16b remain unchanged by the data migration event. Specifically, the physical serial number 62 for source array 16a remains "123456" and the physical serial number 62 for the destination array 16b remains "456789".

For the migration of the data and connections to be transparent to the management application 22, the management application should be able to continue addressing messages to serial number "123456A0", e.g., as though the data migration had not occurred, and yet such messages should be routed to the destination array to which the data have been migrated. Exchanging the array names within the array name table 24 is one mechanism for accomplishing this purpose, as described in connection with FIG. 11. Another mechanism is to exchange the associated IP addresses in the DNS table, as described in connection with FIG. 12.

Figure 11:
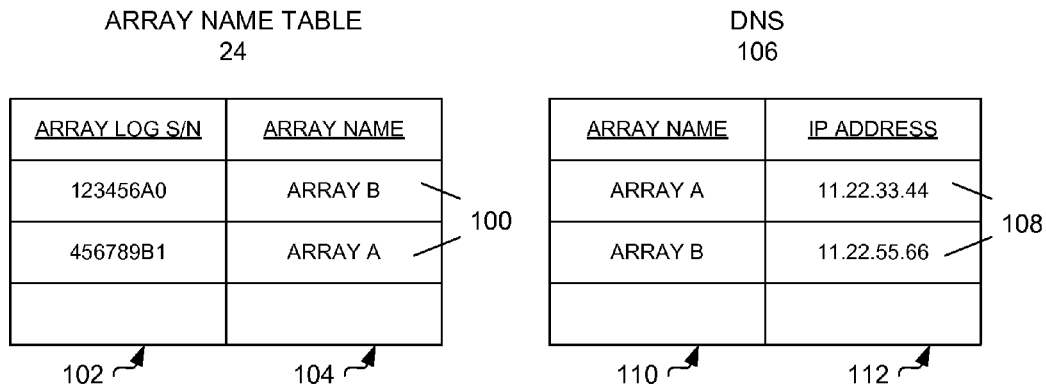
FIG. 11 is a first exemplary representation of the array name and DNS tables of FIG. 5 after completion of the data migration event.

FIG. 11 shows a first exemplary representation of the array name table 24 and DNS table 106 after completion of the data migration event. In this exemplary representation, the array names associated with arrays 16a, 16b, namely "ARRAY A" and "ARRAY B", respectively, are exchanged within the array name table 24, whereas the DNS table 106 is unchanged. More specifically, the entry 100 of the array name table 24 that previously associated the serial number "123456A0" with the array name "ARRAY A" (FIG. 5), as a result of the exchange associates serial number "123456A0" with the array name "ARRAY B". Conversely, the entry 100 of the array name table 24 that previously associated the serial number "456789B1" with the array name "ARRAY B" (FIG. 5), currently associates serial number "456789B1" with the array name "ARRAY A" as a result of the exchange.

Before the data migration event, when the management application 22 prepared a message to be sent to the storage array associated with serial number "123456A0", the array name table 24 provided the array name of "ARRAY A". For the particular array name "ARRAY A", the DNS table 106 provided the IP address of 11.22.33.44. Consequently, messages issued by the management application 22 were directed to the storage array with the IP address of 11.22.33.44. Before the data migration event, the recipient of such messages was the storage array 16a (being associated with the IP address 11.22.33.44).

In the case of exchanging array names in the array name table 24, after the data migration event, when the management application 22 prepares a message to be sent to the storage array associated with serial number "123456A0", the array name table 24 provides the array name of "ARRAY B". For the array name of "ARRAY B", the DNS table 106 provides the IP address of 11.22.55.66. Consequently, messages issued by the management application 22 are routed to the storage array located at IP address 11.22.55.66. This is storage array 16b. Accordingly, the recipient of such messages is the storage array 16b, which appropriately is the destination array to which the data and connections have migrated.

Figure 12:
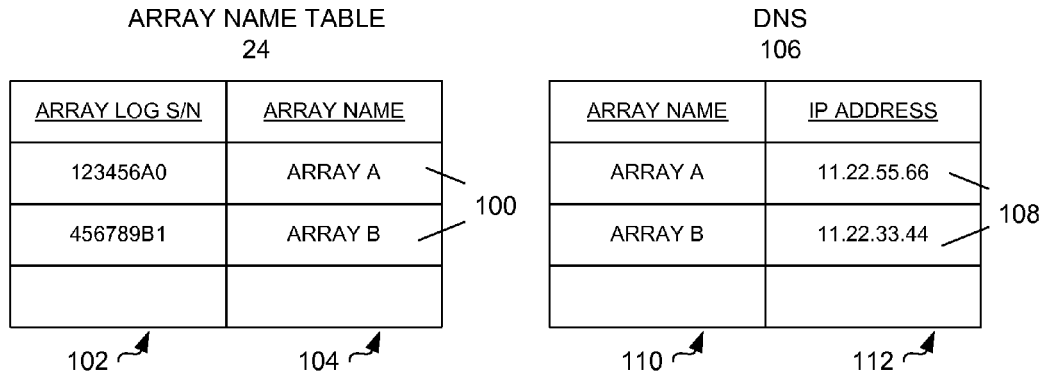
FIG. 12 is a second exemplary representation of the array name and DNS tables of FIG. 5 after completion of the data migration event.

FIG. 12 is a second exemplary representation of the array name table 24 and DNS table 106 after completion of the data migration event. In this exemplary representation, the IP addresses associated with the array names are exchanged within the DNS table 106, whereas the associations between the serial numbers and array names within the array name table 24 are unchanged. More specifically, the entry 108 of the DNS table 106 that previously associated the array name "ARRAY A" with IP address 11.22.33.44 (FIG. 5), as a result of the exchange, associates the array name "ARRAY A" with IP address 11.22.55.66. Conversely, the entry 108 of the DNS table 106 that previously associated the array name "ARRAY B" with IP address 11.22.55.66 (FIG. 5), as a result of the exchange associates the array name "ARRAY B" with IP address 11.22.33.44.

Before the data migration event, when the management application 22 prepared a message to be sent to the storage array associated with serial number "123456A0", the array name table 24 provided the array name of "ARRAY A". For the particular array name "ARRAY A", the DNS table 106 provided the IP address of 11.22.33.44. Consequently, messages issued by the management application 22 were directed to the storage array at the IP address of 11.22.33.44. Before the data migration event, the recipient of such messages was the storage array 16a (being located at IP address 11.22.33.44).

After the data migration event, when the management application 22 prepares a message to be sent to the storage array associated with serial number "123456A0", the array name table 24 provides the array name of "ARRAY A". For the array name of "ARRAY A", the DNS table 106 provides the IP address of 11.22.55.66. Consequently, messages issued by the management application 22 are directed to the storage array located at IP address 11.22.55.66, which is storage array 16b. Accordingly, the recipient of such messages is appropriately the storage array 16b, the destination array to which the data and connections have fully migrated.

Figure 13:
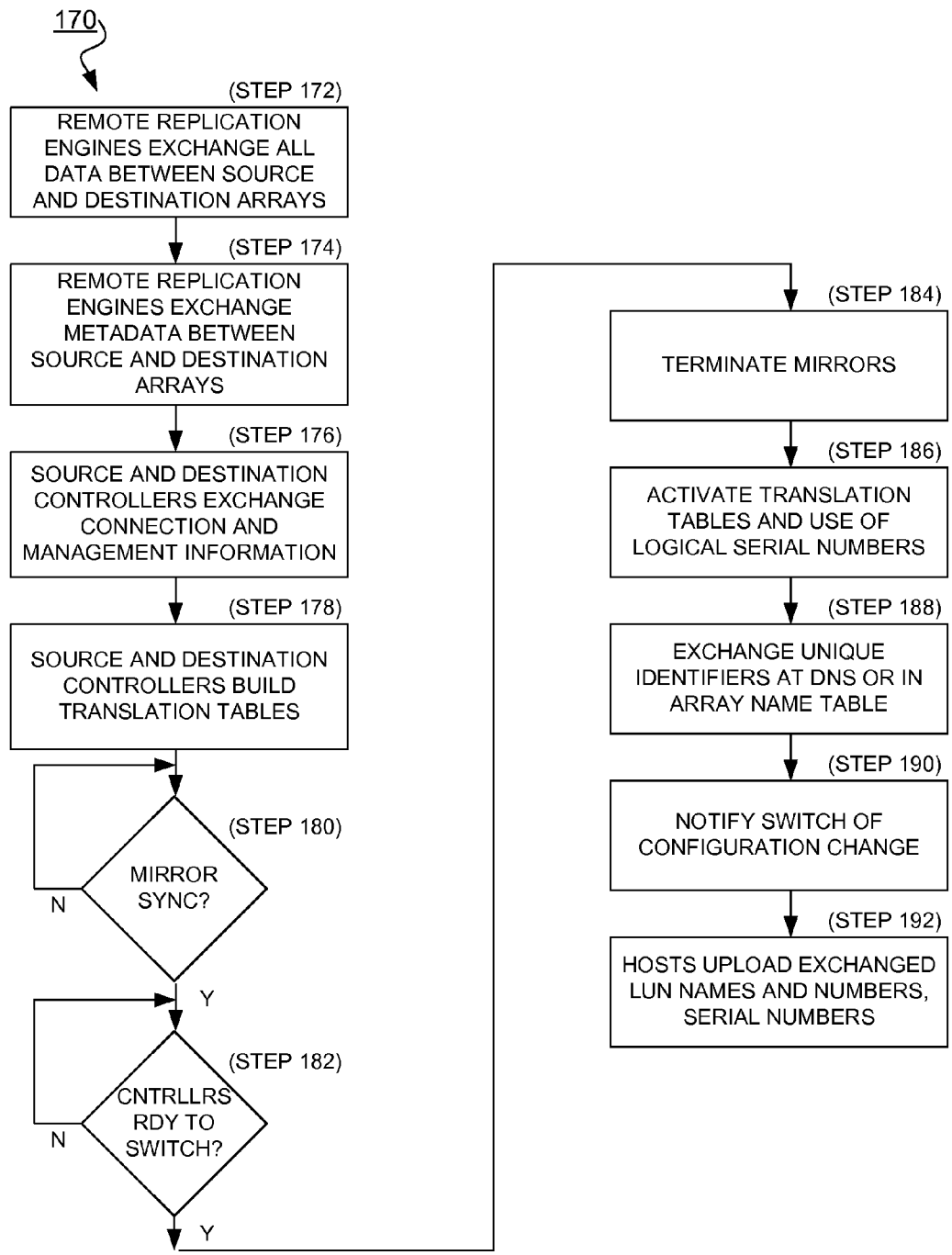
FIG. 13 is a flow diagram of an embodiment of process for performing the data migration event of FIG. 7.

FIG. 13 shows an embodiment of a process 170 for executing a data migration event in accordance with the invention. In the description of the process 180, reference is also made to features disclosed in FIG. 2 and FIG. 6. The remote replication engines 126 of the arrays 16a, 16b exchange (step 172) all data stored in disks 58 at the source array 16a and with data stored in disks 58 at the destination array 16b. The exchange of data between the source and destination arrays 16a, 16b passes over the dedicated link 65. For the purposes of illustrating the process, the remote replication engines 126 also exchange (step 174) select metadata 130 stored in memory 124 at the source array 16a and at the destination array 16b. Whether particular metadata are copied depends on whether the attribute associated with that metadata is set. The copied metadata passes to the destination array 16b over the link 65.

During the exchanging of data and metadata, which can take an extended duration (e.g., days), the remote replication engines 126 maintain synchronization of the data and metadata between the source and destination arrays 16a, 16b. That is, at the source array 16a, e.g., the remote replication engine 126 intercepts, replicates, and forwards any updates to previously copied and forwarded data and metadata.

The array controller 66 of the source array 16a and array controller 68 of the destination array 16b cooperate to perform the exchanges of array port names, LUN name, LUN numbers, and logical serial numbers described in connection with FIG. 7. While the remote replication engine 126 is replicating and forwarding data and metadata to the destination array 16b, each controller 66, 68 sends (step 176) its port names, LUN names, LUN numbers, and logical serial number to the other controller and receives the other controller's port names, LUN names, LUN numbers, and logical serial number over the point-to-point link 65.

Each controller 66, 68 uses the array port names, LUN names, and LUN numbers received from the other controller to build (step 178) translation tables 67, 69, respectively, to map its current port names, LUN names, and LUN numbers to new port names, LUN names, and LUN numbers.

FIG. 14, FIG. 15, and FIG. 16 show embodiments of the various translation tables 67, 69 referenced by the controllers 66, 68, respectively. The translation tables include a respective port-name translation table 67a, 69a, a respective LUN name translation table 67b, 69b, and a respective LUN number translation table 67c, 69c. In FIG. 14, each port-name translation table 67a, 69a includes an entry for each port on the array 16a, 16b, respectively. Each entry contains the current port name, and one of the new port names received from the other array. Each port-name translation table 67a, 69a has two entries. As an illustrative example, for port-name translation table 67a, the first entry associates the source array port name A with the destination array port name C, and the second entry associates the source array port name B with the destination array port name D. For port-name translation table 69a, the first entry associates the destination array port name C with the source array port name A, and the second entry associates the destination array port name D with the source array port name B.

In FIG. 15, each LUN-name translation table 67b, 69b includes an entry for each LUN. Each entry includes the current LUN name and a new LUN name received from the other array. As illustrative examples, in each of the LUN-name translation tables 67b, 69b there are six entries. For LUN-name translation table 67b, the current source array LUNs m, n, p, q, r, and s are associated with the new LUN names t, u, v, x, y, and z (received from the destination array). For LUN-name translation table 69b, the current destination array LUNs t, u, v, x, y, and z are associated with the new LUN names m, n, p, q, r, and s (received from the source array).

In the example shown in FIG. 16, each LUN-number translation table 67c, 69c has six entries. For LUN-number translation table 67c, the current source array LUN numbers 40, 41, 42, 50, 51, and 52 are associated with the new LUN numbers 60, 61, 62, 70, 71, and 72, respectively, which were received from the destination array 16b. For LUN-number translation table 69c, the current destination array LUN numbers 60, 61, 62, 70, 71, and 72 are associated with the new LUN numbers 40, 41, 42, 50, 51, and 52, respectively, which were received from the source array 16a. The information in the tables 67, 69 can be stored as one table, or separate tables, in accordance with design requirements and convenience.

Referring back to FIG. 13, after the remote replication process indicates synchronization of the arrays (step 180), the controllers 66, 68 perform a handshake function to determine whether both arrays 16a, 16b are ready to switch to using their newly received array port names, LUN names, LUN numbers, gatekeepers, and logical serial numbers (step 182). When both arrays 16a, 16b are ready, each controller 66, 68 terminates (step 184) the remote replication process at its respective array and activates (step 186) its translation tables 67, 69, causing the new array port names, LUN numbers, and logical serial numbers to be used by the arrays 16, thereby completing the exchange. At step 188, the unique identifiers used to route messages to the arrays 16a, 16b over the network 20 are swapped (either at the DNS 26 or in the array name table 24).

At step 190, the switch 14 detects the configuration change, causing the switch 14 to rebuild its name server table 72. In accordance with one embodiment, the configuration change is indicated by causing the switch 14 to recognize a "link bounce". A link bounce causes temporary inaccessibility of the arrays 16a, 16b. The link bounce is transparent to the hosts 12, 18. In accordance with Fibre Channel protocol, the switch 14 responds to the link bounce by re-building its name server database table 72 and sending it to all registered SAN devices. A link bounce may be caused, for example, by quickly disabling and re-enabling a Fibre Channel transmitter.

The configuration change can be implemented in other manners without departing from the principles of the invention. For example, the destination array 16b could cause a logout and subsequent login; or, a temporary I/O glitch could be caused. Any means for causing the switch to recognize the configuration change can be used in the practice of the invention.

The switch 14 subsequently sends a state change notification to induce the hosts 12 to upload (step 192) the new table 72. The hosts 12 then query the storage arrays 16 for serial numbers, LUN names, and LUN numbers to rebuild their LUN tables 80. The management application 22 continues to communicate with the storage arrays without any recognition that the data and connections have migrated to another array.

Array Partitioning

Figure 17:
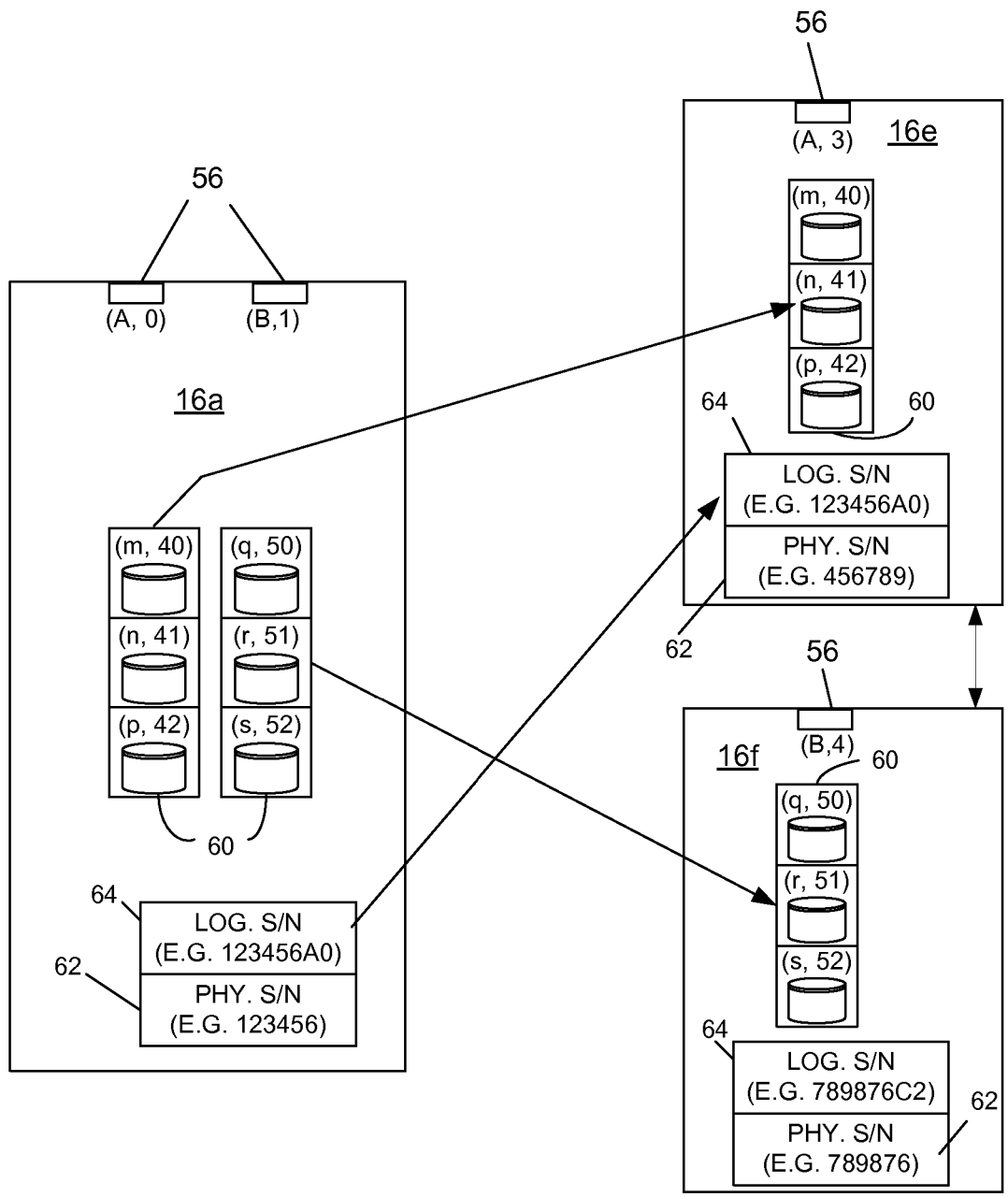
FIG. 17 is a block diagram representation of a data migration event in which a single source storage array is partitioned into multiple destination storage arrays.

In some instances, upgrading or replacing a physical storage array can involve migrating all data from one source array to multiple destination arrays (i.e., a 1 to N transfer). In general, a data migration event involving the migration of all data from a single source array to multiple destination arrays is referred to as array partitioning. FIG. 17 shows a block diagram representation of array partitioning, in which all data resident in disks 58 at the source array 16a are migrated to the destination storage arrays 16e, 16f. To accomplish this partitioning, the combined number of array ports 56 and number of LUNs 60 of the destination storage arrays 16e, 16f are at least as many as the number of array ports 56 and number of LUNs 60 of the source array 16a. In addition, the storage capacity of each LUN of the destination arrays 16e, 16f is as large as its corresponding LUN of the source array 16a.

As an illustrative example, before the data migration event, the source array 16a has array ports 56 with name-ID pairs of (A, 0) and (B, 1) and LUNs (m, 40), (n, 41), (p, 42), (q, 50), (r, 51), and (s, 52). The storage array 16a also has a unique physical serial number 62 (here, e.g., 123456), a unique logical serial number 64 (e.g., 123456A0), a gatekeeper, an array name, and an IP address.

The pre-transfer LUNs, array port names, gatekeepers, and logical serial numbers of the destination arrays 16e, 16f are not shown in FIG. 17, emphasis instead being placed on illustrating the results of partitioning data across the destination arrays. Accordingly, FIG. 17 shows the results of the transfer of information from the source array 16a to the destination arrays 16e, 16f, as described below in connection with FIG. 18.

Figure 18:
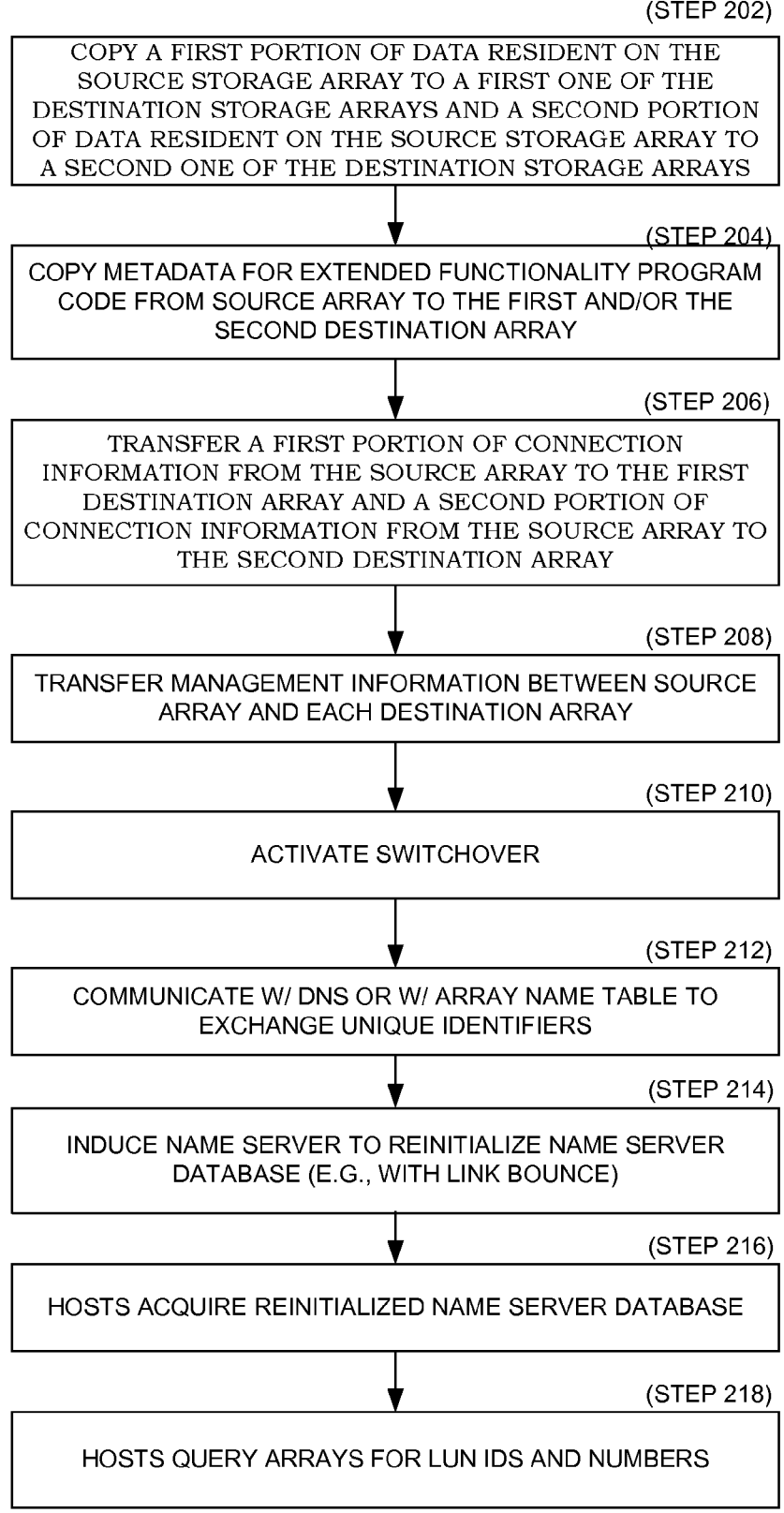
FIG. 18 is a flow diagram of an embodiment of process for partitioning data at a single source storage array into multiple destination storage arrays.

FIG. 18 shows an embodiment of process 200 for partitioning all data resident in LUNs 60 at the source array 16a onto the destination storage arrays 16e, 16f. The process 200 occurs transparently to the hosts 12, 18 and host applications 22, 28. In the description of the process 200, reference is also made to features shown in FIG. 17. Although described with respect to two destination arrays, the principles of the partitioning process apply to more than two destination arrays.

At step 202, remote replication engine 126 copies all data resident at a first set of LUNs at the source storage array 16a to the first destination storage array 16e and data resident at a second set of LUNs at the source array 16a to the second destination storage array 16f. For example, the source array 16a sends copies of data in LUNs (m, 40), (n, 41), and (p, 42) to the first destination array 16e and copies of data in LUNs (q, 50), (r, 51), and (s, 52) to the second destination array 16f.

In one embodiment, metadata at the source array 16a are also migrated to the destination arrays. As described above, the remote replication engine 126 accesses the metadata as LUNs. Each metadata LUN is associated with one of the sets of LUNs. If the attribute of a metadata LUN so indicates, the remote replication engine 126 copies (step 204) the metadata LUN for forwarding to one of the destination arrays. The particular destination array to which the metadata LUN is forwarded depends upon with which set of LUNs the metadata LUN is associated and to which destination array that set of LUNs migrated. That is, each copied and forwarded metadata LUN follows its associated set of LUNs to that destination array. For example, the source array 16a sends the metadata LUNs associated with the set comprised of LUNs (m, 40), (n, 41), and (p, 42) to the first destination array 16e, and those metadata LUNs associated with the set comprised of LUNs (q, 50), (r, 51), and (s, 52) to the second destination array 16f.

At step 206, the source array 16a transfers a first portion of the Fibre Channel connection information to the first destination array 16e and a second portion of the Fibre Channel connection information to the second destination array 16f. The portion of connection information sent to a particular destination array corresponds with the LUNs that have been migrated to that destination array. For example, the source array 16a sends the array port name "A" of the name-ID pair (A, 0) to the first destination array 16e, where the LUNs (m, 40), (n, 41), and (p, 42) have migrated—the array port named "A" being the array port previously used to access data in these LUNs. At the first destination array 16e, the array port name "A" becomes associated with port ID 3, with the new port name-ID pair becoming (A, 3). In addition, the source array 16a sends the array port name "B" of the name-ID pair (B, 1) to the second destination array 16f, where the LUNs (q, 50), (r, 51), and (s, 52) have migrated. At the second destination array 16f, the array port name "B" becomes associated with port ID 4, the new port name-ID pair becoming (B, 4).

At step 208, the source array 16a transfers management information with one of the destination arrays 16e, 16f, referred to as a primary destination array. (The administrator can select one of the destination arrays as the primary destination array for purposes of this management information transfer). In this example, the destination array 16e is the primary destination array. Accordingly, the source array 16a sends the exemplary logical serial number of "123456A0" to the destination array 16e. The destination array 16e also assumes the array name of the source array 16a (which, in the case of an exchange, receives the array name of the destination array 16e). In addition, the source array 16a sends an appropriate portion of the gatekeeper to the first destination array 16e, i.e., the portion of the gatekeeper that corresponds to the set of LUNs transferred to the first destination array 16e.

The second destination array 16f (i.e., non-primary array) keeps its logical sequence number (here, 789876C2) and array name (here, DEST ARRAY), but receives a portion of the gatekeeper appropriate for the second destination array 16f, i.e., the portion of the gatekeeper that corresponds to the set of LUNs transferred to the second destination array 16f.

In addition, after the completion of the copying of data and metadata and after the transfer of connection and management information, switchover is activated (step 210). The source array 16a, destination array 16e, or administrator control station can then communicate (step 212) with the DNS server 26 to transfer the IP address of the source array 16a to the destination arrays 16e. Alternatively, the array name of the source array 16a can be transferred to the destination array 16e in the array name table 24.

From the perspective of the management application 22 (FIG. 1) executing on the host 18, the process of partitioning occurs transparently. Accordingly, the management application 22 can continue to run as though accessing data at the source storage array 16a. In this specific example, the management application 22 continues to issue messages directed to serial number "123456A0" (previously associated with the source array).

Because of the transfer of the array name of the source array 16a to the destination array 16e in the array name table 24, or of the transfer of the source array IP address at the DNS server 26, the management messages are addressed to the IP address of the destination array 16e after the switchover. Also, because some of the LUNs of the storage array have migrated to the second destination array 16f, messages arriving at the first destination array 16e may be intended for a LUN on the second destination array 16f. The first destination array 16e may maintain a look-up table for determining that the sought-for LUN is at the second destination array 16f. Accordingly, the first destination array 16e redirects the message to the second destination array 16f (i.e., over a communication link).

In one embodiment, the switch 14 contains the name server, which reinitializes (step 214) the name-server database 70. In another embodiment, the name server is separate from the switch 14. The updated name-server database is uploaded (step 216) to the devices, including the hosts, and the hosts subsequently query (step 218) the destination arrays 16e, 16f using the LUN ID-LUN numbers.

Figure 19:
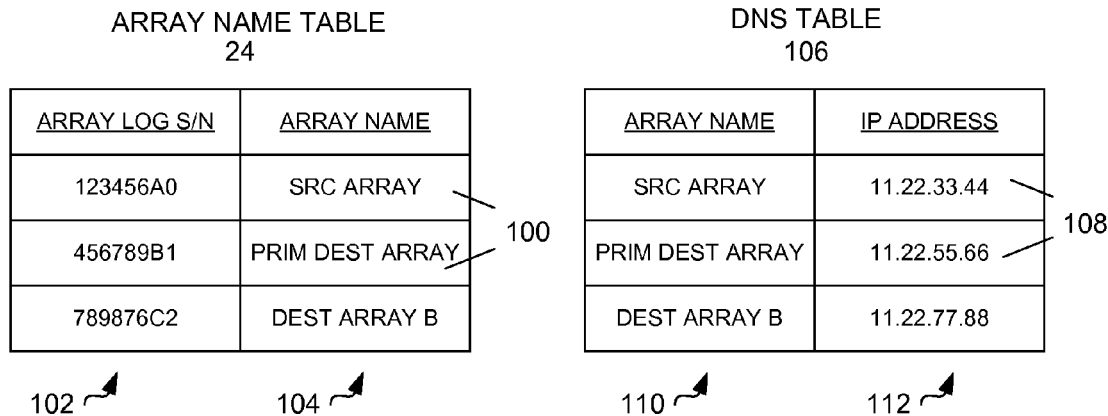
FIG. 19 are exemplary representations of an array name table used by a host to map serial numbers to storage array names and of a DNS table used to resolve storage array names to IP addresses before a data migration event involving array partitioning.

FIG. 19 shows an embodiment of the array name table 24 and DNS table 106 before the array partitioning of FIG. 17. In the example shown, the array name table 24 associates logical serial number "123456A0" with array name "SRC ARRAY", logical serial number "456789B1" with array name "PRIM DEST ARRAY", and logical serial number "789876C2" with array name "DEST ARRAY B". In the example shown, the DNS table 106 associates array name "SRC ARRAY" with IP address 11.22.33.44, array name "PRIM DEST ARRAY" with IP address 11.22.55.66, and array name "DEST ARRAY B" with IP address 11.22.77.88.

Figure 20:
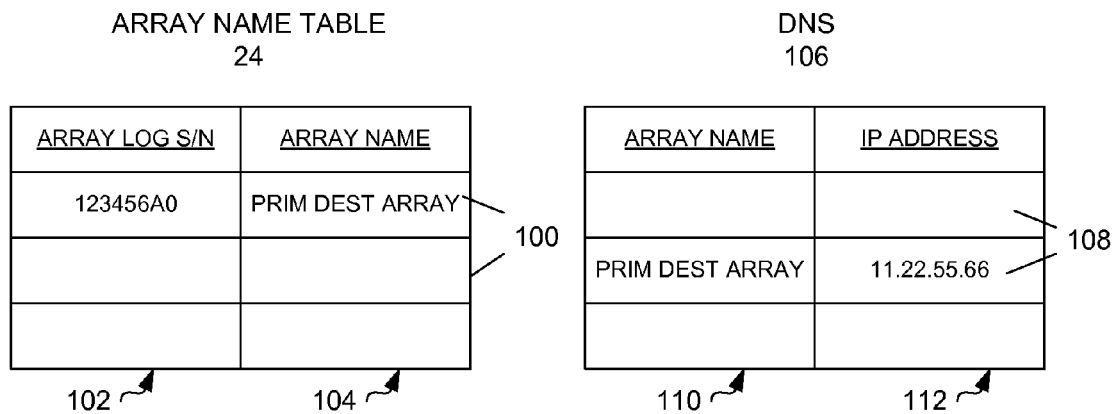
FIG. 20 is a first exemplary representation of the array name and DNS tables of FIG. 19 after completion of the data migration event involving array partitioning.

FIG. 20 shows a first exemplary representation of the array name table 24 and DNS table 106 after completion of the array partitioning. In this exemplary representation, the logical serial number associated with the array name of the source array 16a, namely "SRC ARRAY", becomes associated with the array name of the destination array 16e, namely "PRIM DEST ARRAY", within the array name table 24, whereas the DNS table 106 is unchanged. In this example, the array 16e is the primary destination array. More specifically, the entry 100 of the array name table 24 that previously associated the serial number "123456A0" with the array name "SRC ARRAY" (FIG. 19), as a result of the transfer now associates serial number "123456A0" with the array name "PRIM DEST ARRAY". The entries for the SRC ARRAY and DEST ARRAY B can be removed from the tables 24, 106. The SRC ARRAY entry can be removed because the destination arrays 16e, 16f have, in effect, replaced the source array 16a as a result of the partitioning. The DEST ARRAY B entry can be removed because the primary destination array 16e manages communications directed to the second destination array 16f.

Before the data migration event, when the management application 22 prepared a message to be sent to the storage array associated with serial number "123456A0", the array name table 24 provided the array name of "SRC ARRAY". For the particular array name "SRC ARRAY", the DNS table 106 provided the IP address of 11.22.33.44. Consequently, messages issued by the management application 22 were directed to the storage array with the IP address of 11.22.33.44. Before the data migration event, the recipient of such messages was the storage array 16a (being associated with the IP address 11.22.33.44).

After the array partitioning, when the management application 22 prepares a message to be sent to the storage array associated with serial number "123456A0", the array name table 24 provides the array name of "PRIM DEST ARRAY". For the array name of "PRIM DEST ARRAY", the DNS table 106 provides the IP address of 11.22.55.66. Consequently, messages issued by the management application 22 are routed to the storage array located at IP address 11.22.55.66. This is the destination storage array 16e. Accordingly, the recipient of such messages is the primary destination array 16e. The primary destination array 16e forwards to the destination array 16f any messages addressed to LUNs migrated to the destination array 16f.

Figure 21:
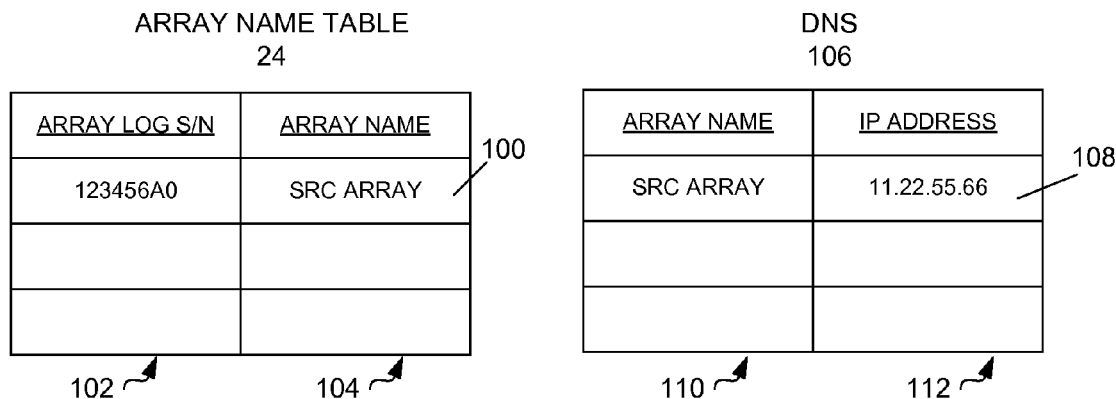
FIG. 21 is a second exemplary representation of the array name and DNS tables of FIG. 19 after completion of the data migration event involving array partitioning.

FIG. 21 is a second exemplary representation of the array name table 24 and DNS table 106 after completion of the data migration event. In this exemplary representation, the IP addresses associated with the array names of the source and primary destination arrays 16a, 16e are exchanged within the DNS table 106, whereas the associations between the serial numbers and array names within the array name table 24 are unchanged. More specifically, the entry 108 of the DNS table 106 that previously associated the array name "SRC ARRAY" with IP address 11.22.33.44 (FIG. 19), as a result of the exchange now associates the array name "SRC ARRAY" with IP address 11.22.55.66. Notably, the entries for the PRIM DEST ARRAY and DEST ARRAY B can be removed from the tables 24, 106 because the logical serial number and array name of the source array 16a have become associated with the primary destination array 16e and now operate to direct communications to the primary destination array 16e as described below.

After the array partitioning, when the management application 22 prepares a message to be sent to the storage array associated with serial number "123456A0", the array name table 24 provides the array name of "SRC ARRAY". For the array name of "SRC ARRAY", the DNS table 106 provides the IP address of 11.22.55.66. Consequently, messages issued by the management application 22 are directed to the storage array located at IP address 11.22.55.66, which is the primary destination storage array 16e.

Array Consolidation

Figure 22:
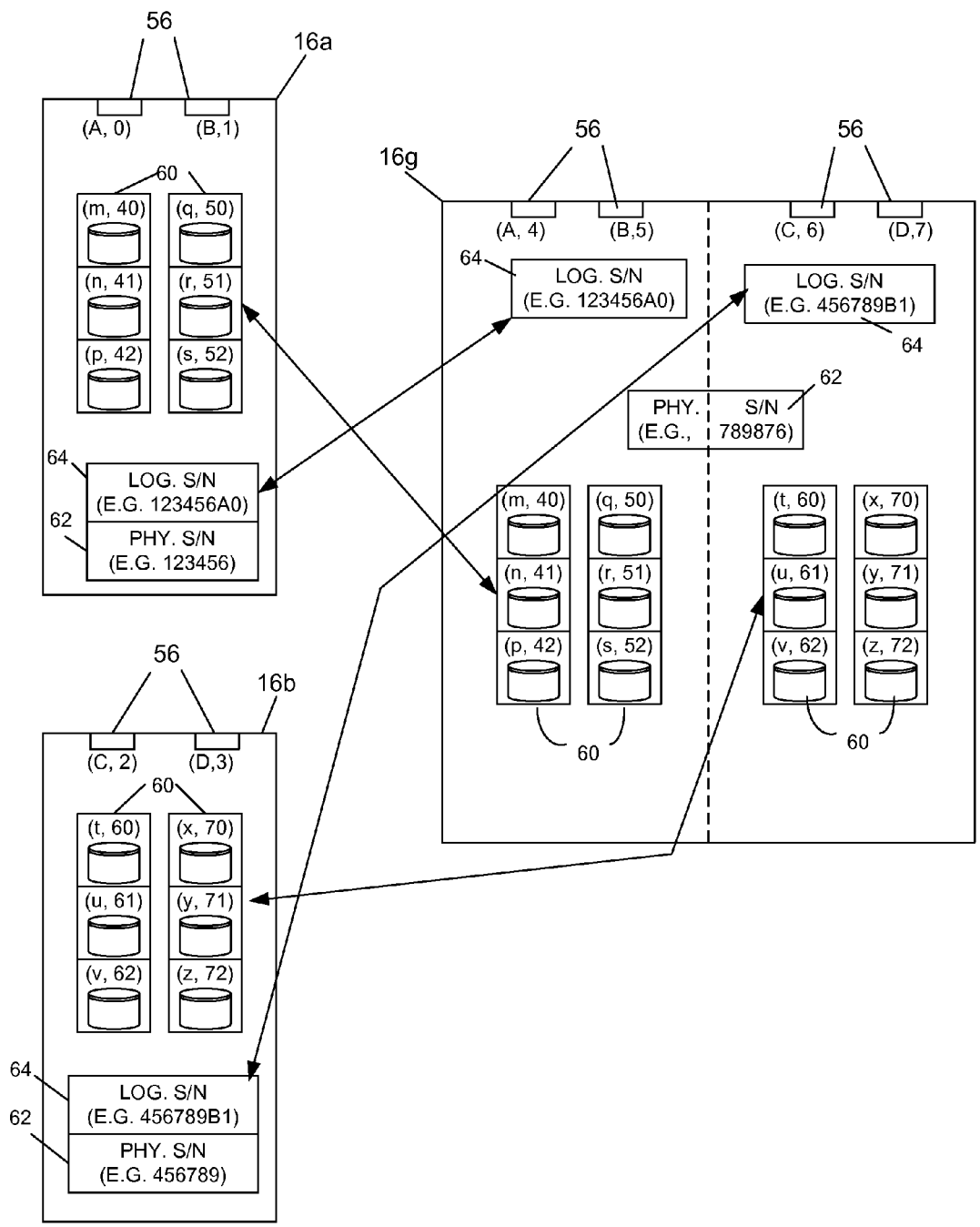
FIG. 22 is a block diagram representation of a data migration event in which data at multiple source arrays are consolidated into a single destination array.

Upgrading or replacing data storage can also involve migrating all data stored in disks at multiple storage arrays to a single storage array (i.e., a N to 1 transfer). In general, a data migration event involving the migration of full arrays of data from multiple source arrays to a single destination array is referred to as array consolidation. FIG. 22 shows a block diagram representation of array consolidation in which data resident at multiple source arrays 16a, 16b are fully migrated to a single destination array 16g. To accomplish this consolidation, the number of array ports 56 and number of LUNs 60 of the destination array 16g are at least as many as the combined number of array ports 56 and number of LUNs 60 of the source arrays 16a, 16b. In addition, the storage capacity of each LUN of the destination array 16g is as large as its corresponding LUN of the source arrays 16a, 16b.

As an illustrative example, before the data migration event, the source array 16a has array ports 56 with name-ID pairs of (A, 0) and (B, 1) and the LUNs are (m, 40), (n, 41), (p, 42), (q, 50), (r, 51), and (s, 52). For the source array 16b, the name-ID pairs of the array ports 56 are (C, 2) and (D, 3), the LUNs are LUNs (t, 60), (u, 61), (v, 62), (x, 70), (y, 71), and (z, 72). In addition, each source array 16*a*, 16*b* has an associated unique physical serial number 62, a unique logical serial number 64, an array name, a gatekeeper, and an IP address. The physical and logical serial numbers for source array 16*a* are 123456 and 123456A0, respectively. For source array 16*b*, the physical and logical serial numbers are 456789 and 456789B1, respectively.

Not shown in FIG. 22 are the pre-transfer LUNs, array port names, and logical serial number of the destination array 16*g*, emphasis instead being placed on illustrating the results of consolidating data at the destination array 16*g*. Accordingly, FIG. 22 shows the results of the transfer of information from the source arrays 16*a*, 16*b* to the destination array 16*g*.

Figure 23:
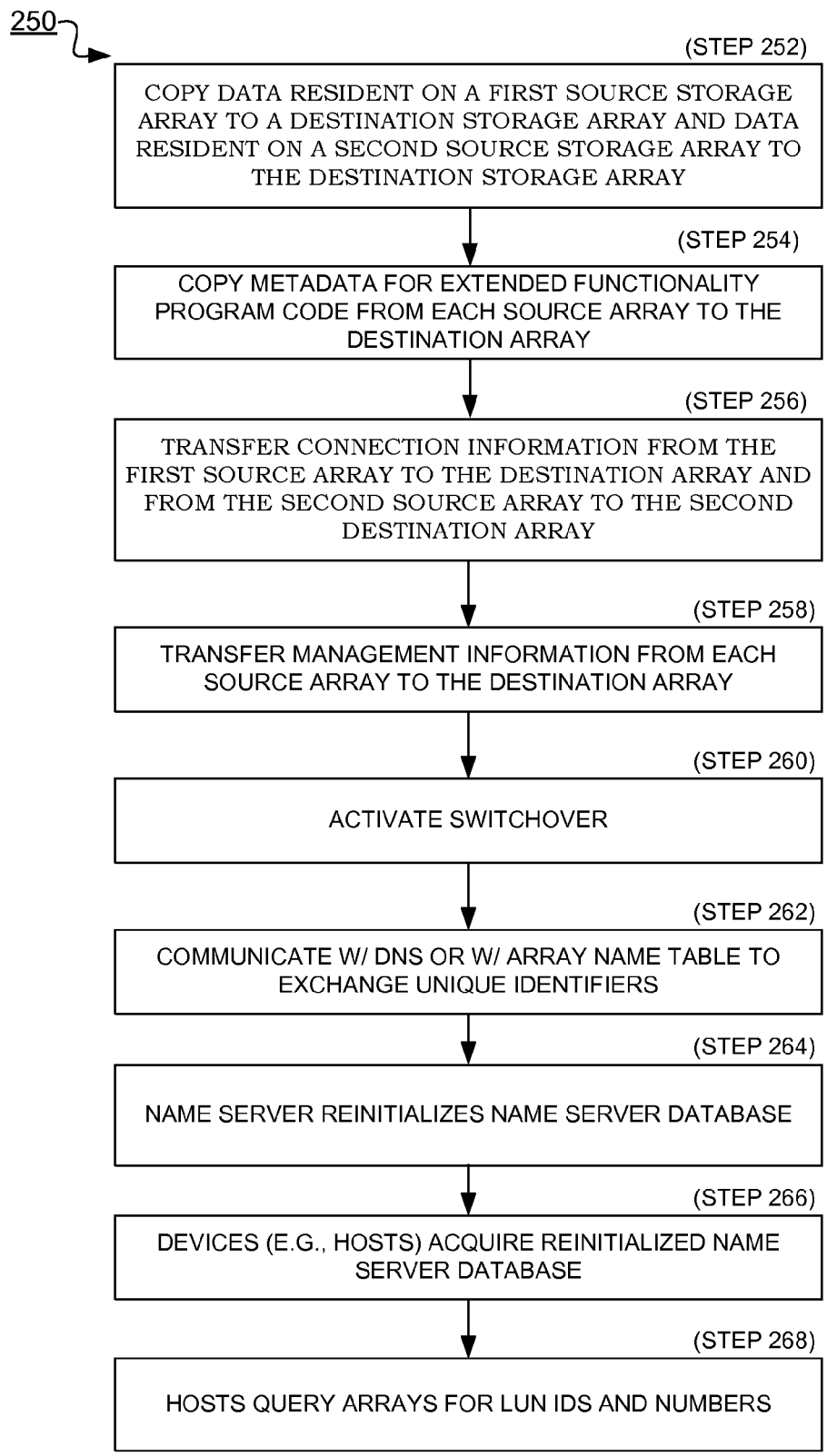
FIG. 23 is a flow diagram of an embodiment of process for consolidating data resident at multiple source storage arrays into a single destination storage array.

FIG. 23 shows an embodiment of process 250 for consolidating data resident at the source storage arrays 16*a*, 16*b* into the single destination array 16*g*. The process 250 executes transparently to the hosts 12, 18 and host applications. In the description of the process 250, reference is also made to features shown in FIG. 22. Although described with respect to two source arrays, the principles of the consolidation process apply to more than two source arrays.

At step 252, remote replication software executing at the first source array 16*a* and remote replication software executing at the second source array 16*b* copy all data resident in the LUNs 60 of the respective source array 16*a*, 16*b* to the destination storage array 16*g*. For example, the source array 16*a* sends copies of data in LUNs (m, 40), (n, 41), (p, 42), (q, 50), (r, 51), and (s, 52) to the destination array 16*g*, and the source array 16*b* sends copies of data in LUNs (t, 60), (u, 61), (v, 62), (x, 70), (y, 71), and (z, 72) to the destination array 16*g*. The copying and transferring of data from the source arrays 16*a*, 16*b* can occur serially or concurrently.

In one embodiment, the remote replication software executing at each source array 16*a*, 16*b* also copies (step 254) metadata stored in memory of that source array, provided the metadata is flagged for copying, and forwards the copied metadata to the destination array 16*g*. At the destination array 16*g*, metadata copied from source array 16*a* remains associated with the set of LUNs migrated from source array 16*a*, and metadata copied from source array 166 remains associated with the set of LUNs migrated from source array 16*b*.

At step 256, each source array 16*a*, 16*b* transfers its Fibre Channel connection information to the destination array 16*g*. For example, the source array 16*a* sends the array port names "A" and "B" of the name-ID pairs (A, 0) and (B, 1) to the destination array 16*g*. At the destination array 16*g*, the array port name "A" becomes associated with port ID 3, the new port name-ID pair becoming (A, 4), the array port name "B" becomes associated with port ID 5, the new port name-ID pair becoming (B, 5). In addition, the source array 16*b* sends the array port names "C" and "D" of the port name-ID pairs (C, 3) and (D, 4) to the destination array 16*g*. At the destination array 16*g*, the array port name "C" becomes associated with port ID 6, the new port name-ID pair becoming (C, 6), the array port name "D" becomes associated with port ID 7, the new port name-ID pair becoming (D, 7).

At step 258, each source array 16*a*, 16*b* transfers management information (such as logical serial numbers and gatekeeper) to the destination array 16*g*. The source array 16*a* sends the exemplary logical serial number of "123456A0" and the source array 16*b* sends the exemplary logical serial number of "456789B1". (The destination array 16*g* can send its logical serial number to one of the source arrays 16*a*, 16*b*, e.g., a designated primary source array). Because of the transfer, the destination array 16*g* has multiple logical serial numbers and gatekeepers. The destination array 16*g* associates each newly received logical serial number and each newly received gatekeeper with the set of LUNs that the destination array 16*g* also received from the source array. The destination array 16*g* can also become associated with both array names and IP addresses of the source arrays 16*a*, 16*b*.

After the copying of data and transferring of information are complete, switchover is activated (step 260). One of the source arrays 16*a*, 16*b*, destination array 16*g*, or an administrator control station can then communicate (step 262) with the DNS server 26 to switch the IP address of each source array 16*a*, 16*b* to the destination array 16*g*. Alternatively, the array name of each source array 16*a*, 16*b* is switched to the array name of the destination array 16*g* in the array name table 24.

Because the consolidation remains transparent to the management application 22 (FIG. 1) executing on the host 18, the management application 22 continues to run as though accessing data at the two separate source arrays 16*a*, 16*b*. When operating as though communicating with the source array 16*a*, the management application 22 continues to issue messages addressed to serial number "123456A0" (previously associated with the source array 16*a*). The exchange of array names (or IP addresses) between the source array 16*a* and the destination array 16*g* causes such messages to be addressed to the IP address of the destination array 16*g*. Similarly, messages issued by the management application 22 addressed to serial number "456789B1" (previously associated with the source array 16*a*) are addressed to the IP address of the destination array 16*g* because of the exchange of array names (or IP addresses) between the source and destination arrays 16*b*, 16*g*.

In one embodiment, the switch 14 contains the name server, and thus reinitializes (step 264) the name-server database 70. In another embodiment, the name server is separate from the switch 14. The updated name-server database is uploaded (step 266) to the hosts. Subsequently, the hosts query (step 268) the destination array 16*g* using the LUN ID-numbers.

Figure 24:
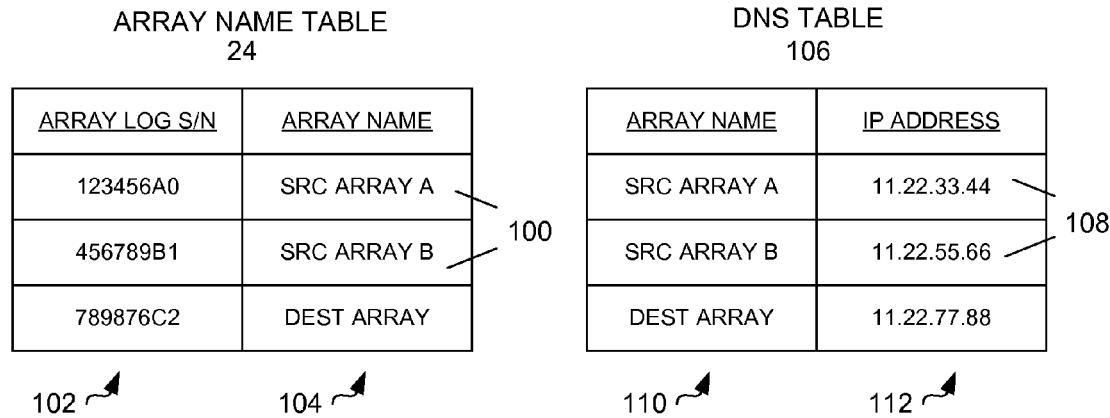
FIG. 24 are exemplary representations of an array name table used by a host to map serial numbers to storage array names and of a DNS table used to resolve storage array names to IP addresses before a data migration event involving array consolidation.

FIG. 24 shows an embodiment of the array name table 24 and DNS table 106 before the data migration event involving array consolidation. In the example shown, the array name table 24 associates logical serial number "123456A0" with array name "SRC ARRAY A", logical serial number "456789B1" with array name "SRC ARRAY B", and logical serial number "789876C2" with array name "DEST ARRAY". In the example shown, the DNS table 106 associates array name "SRC ARRAY A" with IP address 11.22.33.44, array name "SRC ARRAY B" with IP address 11.22.55.66, and array name "DEST ARRAY" with IP address 11.22.77.88.

Figure 25:
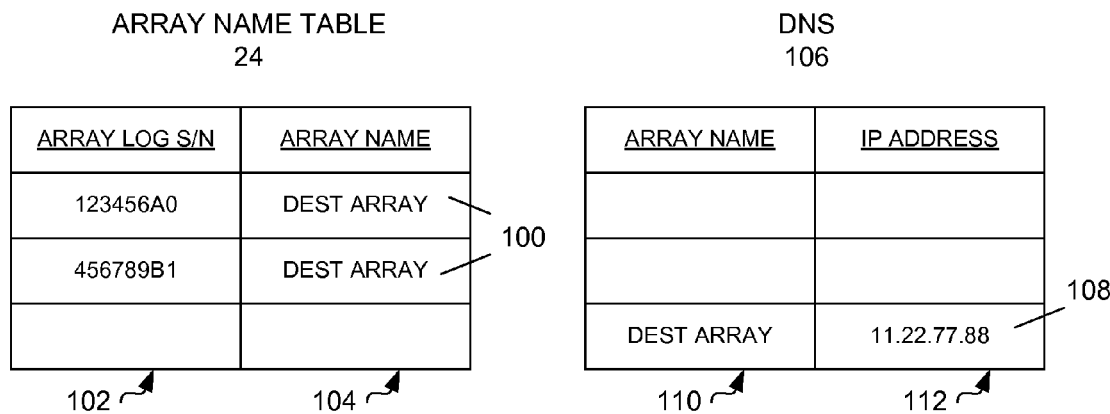
FIG. 25 is a first exemplary representation of the array name and DNS tables of FIG. 24 after completion of the data migration event involving array consolidation.

FIG. 25 shows a first exemplary representation of the array name table 24 and DNS table 106 after completion of the array consolidation. In this exemplary representation, the array name associated with destination array 16*g*, namely "DEST ARRAY", replaces the array name associated with the source array 16*a*, "SRC ARRAY A" within the array name table 24, whereas the DNS table 106 is unchanged. In addition, the array name associated with the destination array 16*g*, namely "DEST ARRAY", replaces the array name associated with the source array 16*b* within the array name table 24. The array names SRC ARRAY A and SRC ARRAY B can be removed from the tables 24, 106 because the destination array 16*g* has replaced the source arrays 16*a*, 16*b* as a result of the consolidation.

More specifically, before the array consolidation, the array name table 24 previously associated the serial number "123456A0" with the array name "SRC ARRAY A" and serial number "456789B1" with the array name "SRC ARRAY B" (FIG. 24). As a result of the exchange, the array name table 24 now associates both serial numbers with the array name "DEST ARRAY".

After the array consolidation, the array name table 24 provides the array name of "DEST ARRAY" for either serial number "123456A0" or "456789B1". For the array name of "DEST ARRAY", the DNS table 106 provides the IP address of 11.22.77.88. Consequently, messages issued by the management application 22 are routed to the storage array located at IP address 11.22.77.88. This is destination storage array 16g. Accordingly, the recipient of such messages is the storage array 16g, which appropriately is the destination array to which the data and connections have migrated.

Figure 26:
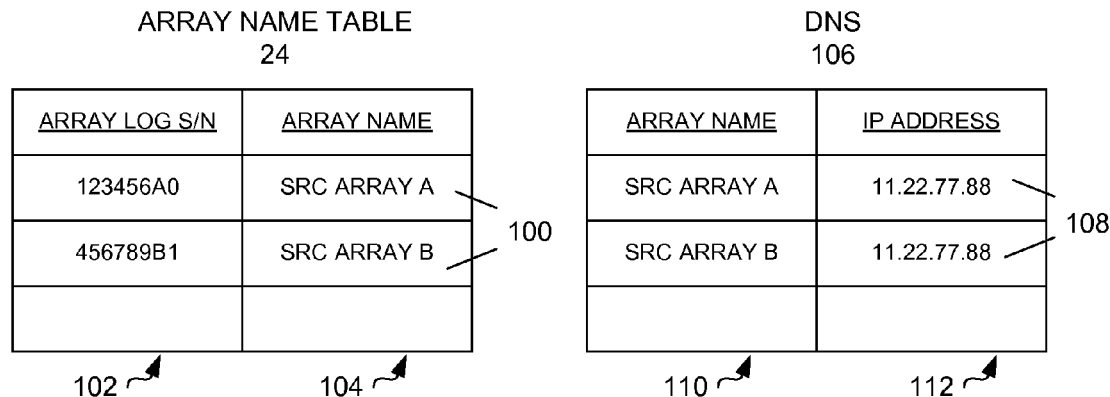
FIG. 26 is a second exemplary representation of the array name and DNS tables of FIG. 24 after completion of the data migration event involving array consolidation.

FIG. 26 is a second exemplary representation of the array name table 24 and DNS table 106 after completion of the array consolidation. In this exemplary representation, the IP addresses associated with the array names are exchanged within the DNS table 106, whereas the associations between the serial numbers and array names within the array name table 24 are unchanged. More specifically, the entry 108 of the DNS table 106 that previously associated the array name "SRC ARRAY A" with IP address 11.22.33.44 and the array name "SRC ARRAY B" with IP address 11.22.55.66 (FIG. 24), as a result of the exchange, now associates both array names with the IP address 11.22.77.88. The entry for the DEST ARRAY can be removed from the tables 24, 106 because the logical serial number and array name of both source arrays 16a, 16b have become associated with the destination array 16g and now operate to direct communications to the destination array 16g as described below.

After the array consolidation, when the management application 22 prepares a message to be sent to the storage array associated with serial number "123456A0" or with serial number "456789B1", the array name table 24 provides the array name of "SRC ARRAY A" or "SRC ARRAY B". For either array name, the DNS table 106 provides the IP address of 11.22.77.88. Consequently, messages issued by the management application 22 are directed to the storage array located at IP address 11.22.77.88, which is the destination storage array 16g.

Aspects of the present invention may be implemented, in whole or in part, as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. One skilled in the art will understand that many specific implementations of hardware, software, and combinations thereof can be employed to achieve the logical functionality of the invention. Although the invention has been shown and described with reference to specific preferred embodiments, it should be understood by those skilled in the art that various changes in form and detail may be made therein without departing from the spirit and scope of the invention as defined by the following claims. For example, the array controllers 65 can be implemented in hardware, software, or combinations thereof. As another example, although the invention has been described primarily with reference to Fibre Channel arrays, switches, and ports, it is to be understood that the principles of the invention apply to other types of devices and transports for use with other types of storage protocols, e.g., iSCSI (Internet Small Computer System Interface).

What is claimed is:

1. A method of migrating data from a source storage array to a destination storage array transparently with respect to a storage application executing on a host, the storage application providing particular storage functionality at the source storage array while using metadata during its execution, the method comprising:

during a data migration event in which data resident in disks at the source storage array are fully copied to the destination storage array, forwarding metadata stored at the source storage array and used by the storage application to the destination storage array.

2. The method of claim 1, further comprising the step of replicating metadata stored at the source storage array before forwarding the metadata to the destination storage array.

3. The method of claim 1, further comprising the step of:
replicating, during the data migration event, metadata that are being updated at the source storage array by the storage application; and
forwarding to the destination storage array a copy of the metadata that are being updated.

4. The method of claim 1, further comprising the steps of:
communicating with the source storage array by the host while executing the storage application, before the data migration event; and
communicating with the destination storage array by the host while executing the storage application after completion of the data migration event.

5. The method of claim 1, further comprising the step of organizing the metadata into logical units of storage (LUNs).

6. The method of claim 5, wherein each metadata LUN is not exposed to the host.

7. The method of claim 1, further comprising the step of associating the metadata with an attribute whose value indicates whether the metadata is to be forwarded.

8. The method of claim 1, wherein the forwarded metadata includes information related to a network connection that the source storage array has to a second storage array.

9. A storage network comprising:
memory storing metadata;
a first storage array executing program code for performing a particular storage functionality, the program code accessing the metadata in the memory during its execution;
a second storage array in communication with the first storage array by a communication link; and
a replication engine, during a data migration event in which data resident in disks at the first storage array are fully copied to the second storage array, forwarding the metadata stored in memory to the second storage array.

10. The storage network of claim 9, wherein the replication engine replicates the metadata before forwarding the metadata to the second storage array.

11. The storage network of claim 9, wherein the program code, during its execution, updates the metadata, and wherein the replication engine replicates each update to the metadata and forwards each replicated update to the second storage array.

12. The storage network of claim 9, wherein the metadata are organized into logical units of storage.

13. The storage network of claim 12, wherein each metadata LUN is not exposed to the host.

14. The storage network of claim 9, wherein the forwarded metadata includes information related to a network connection that the first storage array has to a third storage array.

15. The storage network of claim 9, wherein each metadata have an attribute associated therewith, and the replication engine reads the attribute to determine whether to forward that metadata.

16. The storage network of claim 9, further comprising a host executing a host application for performing the particular storage functionality, the host application accomplishing the particular storage functionality by communicating with the first storage array before the data migration event and with the second storage array after completion of the data migration event.

17. A storage array comprising:

memory storing metadata;

program code for performing a particular storage functionality, the program code accessing metadata in the memory during its execution; and a replication engine, during a data migration event in which data resident in disks at the storage array are fully copied to a destination storage array, forwarding the metadata stored in memory to the destination storage array.

18. The storage array of claim 17, wherein the replication engine replicates the metadata before forwarding the metadata to the destination storage array.

19. The storage array of claim 17, wherein the program code, during its execution, updates the metadata, and wherein the replication engine replicates each update to the metadata and forwards each replicated update to the destination storage array.

20. The storage array of claim 17, wherein the metadata are organized as logical units of storage (LUNs).

21. The storage array of claim 20, wherein each metadata LUN is not exposed to the host.

22. The storage array of claim 17, wherein the forwarded metadata includes information related to a network connection that the storage array has to another storage array.

23. The storage array of claim 17, wherein the metadata have an attribute associated therewith, and the replication engine reads the attribute to determine whether to forward the metadata.

\* \* \* \* \*